(12) United States Patent
Li et al.

(10) Patent No.: US 11,750,816 B2
(45) Date of Patent: Sep. 5, 2023

(54) METHODS AND SYSTEMS FOR CROSS-COMPONENT SAMPLE ADAPTIVE OFFSET

(71) Applicant: ALIBABA GROUP HOLDING LIMITED, Grand Cayman (KY)

(72) Inventors: Xinwei Li, San Mateo, CA (US); Ru-Ling Liao, San Mateo, CA (US); Jie Chen, San Mateo, CA (US); Yan Ye, San Mateo, CA (US)

(73) Assignee: Alibaba Group Holding Limited, Grand Cayman (KY)

( * ) Notice: Subject to any disclaimer, the term of this patent is extended or adjusted under 35 U.S.C. 154(b) by 0 days.

(21) Appl. No.: 17/538,397

(22) Filed: Nov. 30, 2021

(65) Prior Publication Data
US 2022/0182635 A1    Jun. 9, 2022

Related U.S. Application Data

(60) Provisional application No. 63/120,814, filed on Dec. 3, 2020.

(51) Int. Cl.
*H04N 19/186* (2014.01)
*H04N 19/132* (2014.01)
*H04N 19/172* (2014.01)
*H04N 19/105* (2014.01)

(52) U.S. Cl.
CPC ......... *H04N 19/132* (2014.11); *H04N 19/105* (2014.11); *H04N 19/172* (2014.11); *H04N 19/186* (2014.11)

(58) Field of Classification Search
CPC .. H04N 19/132; H04N 19/105; H04N 19/172; H04N 19/186
See application file for complete search history.

(56) References Cited

U.S. PATENT DOCUMENTS

| | | |
|---|---|---|
| 2012/0177107 A1 | 7/2012 | Fu et al. |
| 2018/0063527 A1 | 3/2018 | Chen et al. |
| 2021/0160513 A1* | 5/2021 | Hu .......... H04N 19/117 |
| 2022/0101095 A1* | 3/2022 | Li ............ H04N 19/82 |

FOREIGN PATENT DOCUMENTS

CN    107295337 A    10/2017

OTHER PUBLICATIONS

Call for New generation AVS3 video coding proposals, AVS-N2509, Dec. 2017, 4 pages.

(Continued)

*Primary Examiner* — Hesham K Abouzahra
(74) *Attorney, Agent, or Firm* — Finnegan, Henderson, Farabow, Garrett & Dunner, LLP

(57) ABSTRACT

The present disclosure provides a video data processing method for cross-component sample adaptive offset. The method includes receiving a bitstream; determining a category index of a target chroma sample, wherein the category index is determined based on a first reconstructed value associated with a co-located luma sample and a second reconstructed value associated with the target chroma sample; decoding an index indicating an offset corresponding to the category index from the bitstream; determining the offset based on the index; and adding the offset to a third reconstructed value associated with the target chroma sample.

22 Claims, 18 Drawing Sheets

(56) References Cited

OTHER PUBLICATIONS

HPM, ftp://47.93.196.121/Public/codec/video_codec/HPM.
Jian et al., "CE 4-1 related : Improvement on CCSAO", AVS-M5794, 5 pages, Oct. 2020.
Kuo et al., "CE4-1: Cross-component Sample Adaptive Offset", AVS-M5800, 9 pages, Oct. 2020.
Liang F., "AVS3-P2(CD4.0)", AVS-N2724, Aug. 2019, 228 pages.
PCT International Search Report and Written Opinion dated Feb. 25, 2022, issued in corresponding International Application No. PCT/CN2021/134866 (8 pgs.).

* cited by examiner

METHODS AND SYSTEMS FOR CROSS-COMPONENT SAMPLE ADAPTIVE OFFSET

CROSS-REFERENCE TO RELATED APPLICATIONS

The disclosure claims the benefits of priority to U.S. Provisional Application No. 63/120,814, filed on Dec. 3, 2020, which is incorporated herein by reference in its entirety.

TECHNICAL FIELD

The present disclosure generally relates to video processing, and more particularly, to methods and systems for cross-component sample adaptive offset.

BACKGROUND

A video is a set of static pictures (or "frames") capturing the visual information. To reduce the storage memory and the transmission bandwidth, a video can be compressed before storage or transmission and decompressed before display. The compression process is usually referred to as encoding and the decompression process is usually referred to as decoding. There are various video coding formats which use standardized video coding technologies, most commonly based on prediction, transform, quantization, entropy coding and in-loop filtering. The video coding standards, such as the High Efficiency Video Coding (HEVC/H.265) standard, the Versatile Video Coding (VVC/H.266) standard, and AVS standards, specifying the specific video coding formats, are developed by standardization organizations. With more and more advanced video coding technologies being adopted in the video standards, the coding efficiency of the new video coding standards get higher and higher.

SUMMARY OF THE DISCLOSURE

Embodiments of the present disclosure provide a method for cross-component sample adaptive offset. The method includes receiving a bitstream; determining a category index of a target chroma sample, wherein the category index is determined based on a first reconstructed value associated with a co-located luma sample and a second reconstructed value associated with the target chroma sample; decoding an index indicating an offset corresponding to the category index from the bitstream; determining the offset based on the index; and adding the offset to a third reconstructed value associated with the target chroma sample.

Embodiments of the present disclosure provide an apparatus for performing video data processing, the apparatus comprises a memory figured to store instructions; and one or more processors configured to execute the instructions to cause the apparatus to perform receiving a bitstream; determining a category index of a target chroma sample, wherein the category index is determined based on a first reconstructed value associated with a co-located luma sample and a second reconstructed value associated with the target chroma sample; decoding an index indicating an offset corresponding to the category index from the bitstream; determining the offset based on the index; and adding the offset to a third reconstructed value associated with the target chroma sample.

Embodiments of the present disclosure provide a non-transitory computer readable medium storing a data stream. The data stream comprises an encoded index indicating an offset corresponding to a category index of a target chroma sample, wherein the category index is determined based on a first reconstructed value associated with a co-located luma sample and a second reconstructed value associated with the target chroma sample, and wherein the offset is used to adjust a third reconstructed value associated with the target chroma sample.

BRIEF DESCRIPTION OF THE DRAWINGS

Embodiments and various aspects of the present disclosure are illustrated in the following detailed description and the accompanying figures. Various features shown in the figures are not drawn to scale.

DETAILED DESCRIPTION

Figure 1:
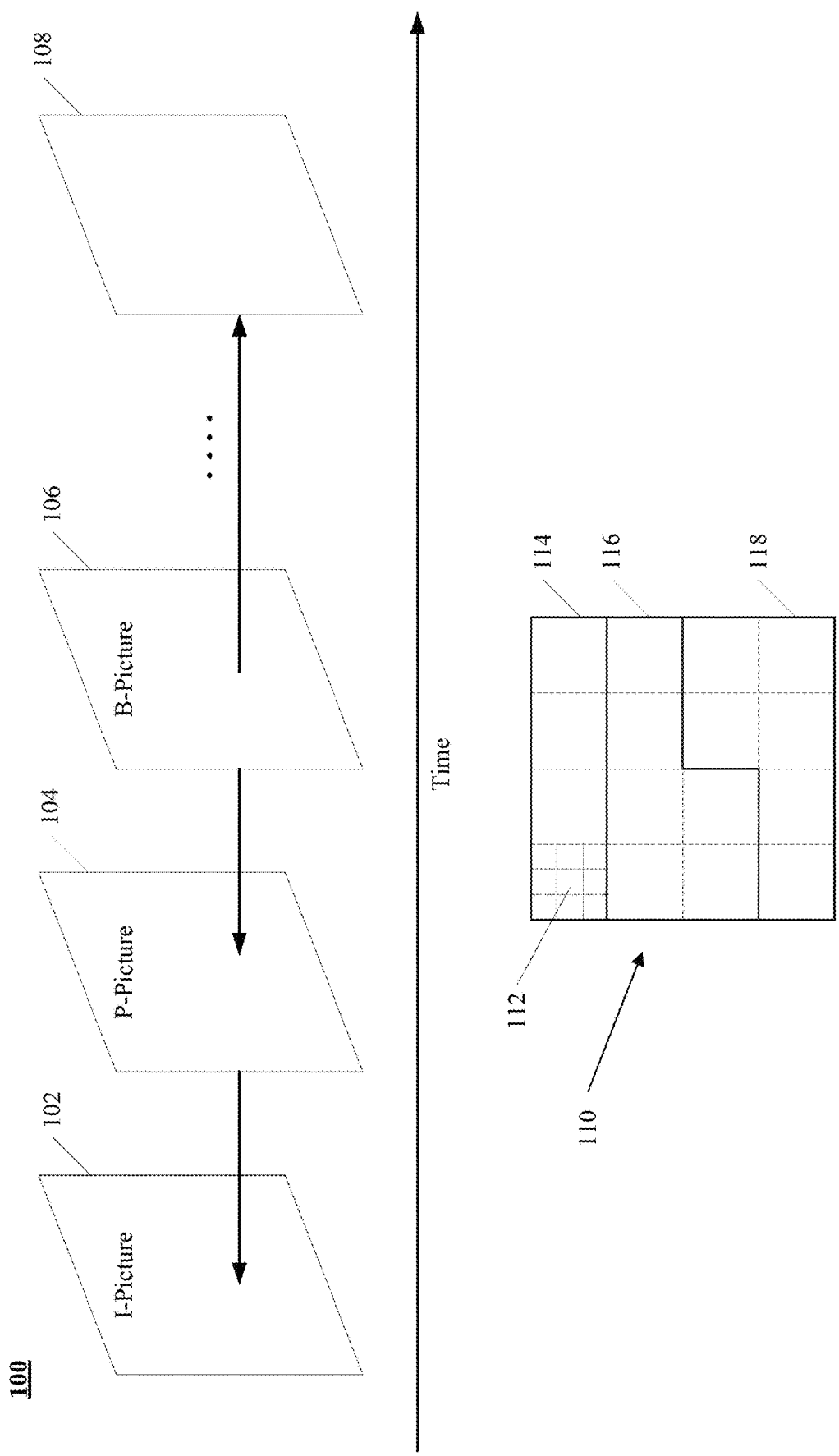
FIG. 1 is a schematic diagram illustrating structures of an example video sequence, according to some embodiments of the present disclosure.

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of apparatuses and methods consistent with aspects related to the invention as recited in the appended claims. Particular aspects of the present disclosure are described in greater detail below. The terms and definitions provided herein control, if in conflict with terms and/or definitions incorporated by reference.

The Joint Video Experts Team (WET) of the ITU-T Video Coding Expert Group (ITU-T VCEG) and the ISO/IEC Moving Picture Expert Group (ISO/IEC MPEG) is currently developing the Versatile Video Coding (VVC/H.266) standard. The VVC standard is aimed at doubling the compression efficiency of its predecessor, the High Efficiency Video Coding (HEVC/H.265) standard. In other words, VVC's goal is to achieve the same subjective quality as HEVC/H.265 using half the bandwidth.

To achieve the same subjective quality as HEVC/H.265 using half the bandwidth, the JVET has been developing technologies beyond HEVC using the joint exploration model (JEM) reference software. As coding technologies were incorporated into the JEM, the JEM achieved substantially higher coding performance than HEVC.

The VVC standard has been developed recent, and continues to include more coding technologies that provide better compression performance. VVC is based on the same hybrid video coding system that has been used in modern video compression standards such as HEVC, H.264/AVC, MPEG2, H.263, etc.

A video is a set of static pictures (or "frames") arranged in a temporal sequence to store visual information. A video capture device (e.g., a camera) can be used to capture and store those pictures in a temporal sequence, and a video playback device (e.g., a television, a computer, a smartphone, a tablet computer, a video player, or any end-user terminal with a function of display) can be used to display such pictures in the temporal sequence. Also, in some applications, a video capturing device can transmit the captured video to the video playback device (e.g., a computer with a monitor) in real-time, such as for surveillance, conferencing, or live broadcasting.

For reducing the storage space and the transmission bandwidth needed by such applications, the video can be compressed before storage and transmission and decompressed before the display. The compression and decompression can be implemented by software executed by a processor (e.g., a processor of a generic computer) or specialized hardware. The module for compression is generally referred to as an "encoder," and the module for decompression is generally referred to as a "decoder." The encoder and decoder can be collectively referred to as a "codec." The encoder and decoder can be implemented as any of a variety of suitable hardware, software, or a combination thereof. For example, the hardware implementation of the encoder and decoder can include circuitry, such as one or more microprocessors, digital signal processors (DSPs), application-specific integrated circuits (ASICs), field-programmable gate arrays (FPGAs), discrete logic, or any combinations thereof. The software implementation of the encoder and decoder can include program codes, computer-executable instructions, firmware, or any suitable computer-implemented algorithm or process fixed in a computer-readable medium. Video compression and decompression can be implemented by various algorithms or standards, such as MPEG-1, MPEG-2, MPEG-4, H.26x series, or the like. In some applications, the codec can decompress the video from a first coding standard and re-compress the decompressed video using a second coding standard, in which case the codec can be referred to as a "transcoder."

The video encoding process can identify and keep useful information that can be used to reconstruct a picture and disregard unimportant information for the reconstruction. If the disregarded, unimportant information cannot be fully reconstructed, such an encoding process can be referred to as "lossy." Otherwise, it can be referred to as "lossless." Most encoding processes are lossy, which is a tradeoff to reduce the needed storage space and the transmission bandwidth.

The useful information of a picture being encoded (referred to as a "current picture") include changes with respect to a reference picture (e.g., a picture previously encoded and reconstructed). Such changes can include position changes, luminosity changes, or color changes of the pixels, among which the position changes are mostly concerned. Position changes of a group of pixels that represent an object can reflect the motion of the object between the reference picture and the current picture.

A picture coded without referencing another picture (i.e., it is its own reference picture) is referred to as an "I-picture." A picture is referred to as a "P-picture" if some or all blocks (e.g., blocks that generally refer to portions of the video picture) in the picture are predicted using intra prediction or inter prediction with one reference picture (e.g., uni-prediction). A picture is referred to as a "B-picture" if at least one block in it is predicted with two reference pictures (e.g., bi-prediction).

FIG. 1 illustrates structures of an example video sequence 100, according to some embodiments of the present disclosure. Video sequence 100 can be a live video or a video having been captured and archived. Video 100 can be a real-life video, a computer-generated video (e.g., computer game video), or a combination thereof (e.g., a real-life video with augmented-reality effects). Video sequence 100 can be inputted from a video capture device (e.g., a camera), a video archive (e.g., a video file stored in a storage device) containing previously captured video, or a video feed interface (e.g., a video broadcast transceiver) to receive video from a video content provider.

As shown in FIG. 1, video sequence 100 can include a series of pictures arranged temporally along a timeline, including pictures 102, 104, 106, and 108. Pictures 102-106 are continuous, and there are more pictures between pictures 106 and 108. In FIG. 1, picture 102 is an I-picture, the reference picture of which is picture 102 itself. Picture 104 is a P-picture, the reference picture of which is picture 102, as indicated by the arrow. Picture 106 is a B-picture, the reference pictures of which are pictures 104 and 108, as indicated by the arrows. In some embodiments, the reference picture of a picture (e.g., picture 104) can be not immediately preceding or following the picture. For example, the reference picture of picture 104 can be a picture preceding picture 102. It should be noted that the reference pictures of pictures 102-106 are only examples, and the present disclosure does not limit embodiments of the reference pictures as the examples shown in FIG. 1.

Typically, video codecs do not encode or decode an entire picture at one time due to the computing complexity of such tasks. Rather, they can split the picture into basic segments, and encode or decode the picture segment by segment. Such basic segments are referred to as basic processing units ("BPUs") in the present disclosure. For example, structure 110 in FIG. 1 shows an example structure of a picture of video sequence 100 (e.g., any of pictures 102-108). In structure 110, a picture is divided into 4×4 basic processing units, the boundaries of which are shown as dash lines. In some embodiments, the basic processing units can be referred to as "macroblocks" in some video coding standards (e.g., MPEG family, H.261, H.263, or H.264/AVC), or as "coding tree units" ("CTUs") in some other video coding standards (e.g., H.265/HEVC or H.266/VVC). The basic processing units can have variable sizes in a picture, such as 128×128, 64×64, 32×32, 16×16, 4×8, 16×32, or any arbitrary shape and size of pixels. The sizes and shapes of the basic processing units can be selected for a picture based on the balance of coding efficiency and levels of details to be kept in the basic processing unit.

The basic processing units can be logical units, which can include a group of different types of video data stored in a computer memory (e.g., in a video frame buffer). For example, a basic processing unit of a color picture can include a luma component (Y) representing achromatic brightness information, one or more chroma components (e.g., Cb and Cr) representing color information, and associated syntax elements, in which the luma and chroma components can have the same size of the basic processing unit. The luma and chroma components can be referred to as "coding tree blocks" ("CTBs") in some video coding standards (e.g., H.265/HEVC or H.266/VVC). Any operation performed to a basic processing unit can be repeatedly performed to each of its luma and chroma components.

Video coding has multiple stages of operations, examples of which are shown in FIGS. 2A-2B and FIGS. 3A-3B. For each stage, the size of the basic processing units can still be too large for processing, and thus can be further divided into segments referred to as "basic processing sub-units" in the present disclosure. In some embodiments, the basic processing sub-units can be referred to as "blocks" in some video coding standards (e.g., MPEG family, H.261, H.263, or H.264/AVC), or as "coding units" ("CUs") in some other video coding standards (e.g., H.265/HEVC or H.266/VVC). A basic processing sub-unit can have the same or smaller size than the basic processing unit. Similar to the basic processing units, basic processing sub-units are also logical units, which can include a group of different types of video data (e.g., Y, Cb, Cr, and associated syntax elements) stored in a computer memory (e.g., in a video frame buffer). Any operation performed to a basic processing sub-unit can be repeatedly performed to each of its luma and chroma components. It should be noted that such division can be performed to further levels depending on processing needs. It should also be noted that different stages can divide the basic processing units using different schemes.

Figure 2A:
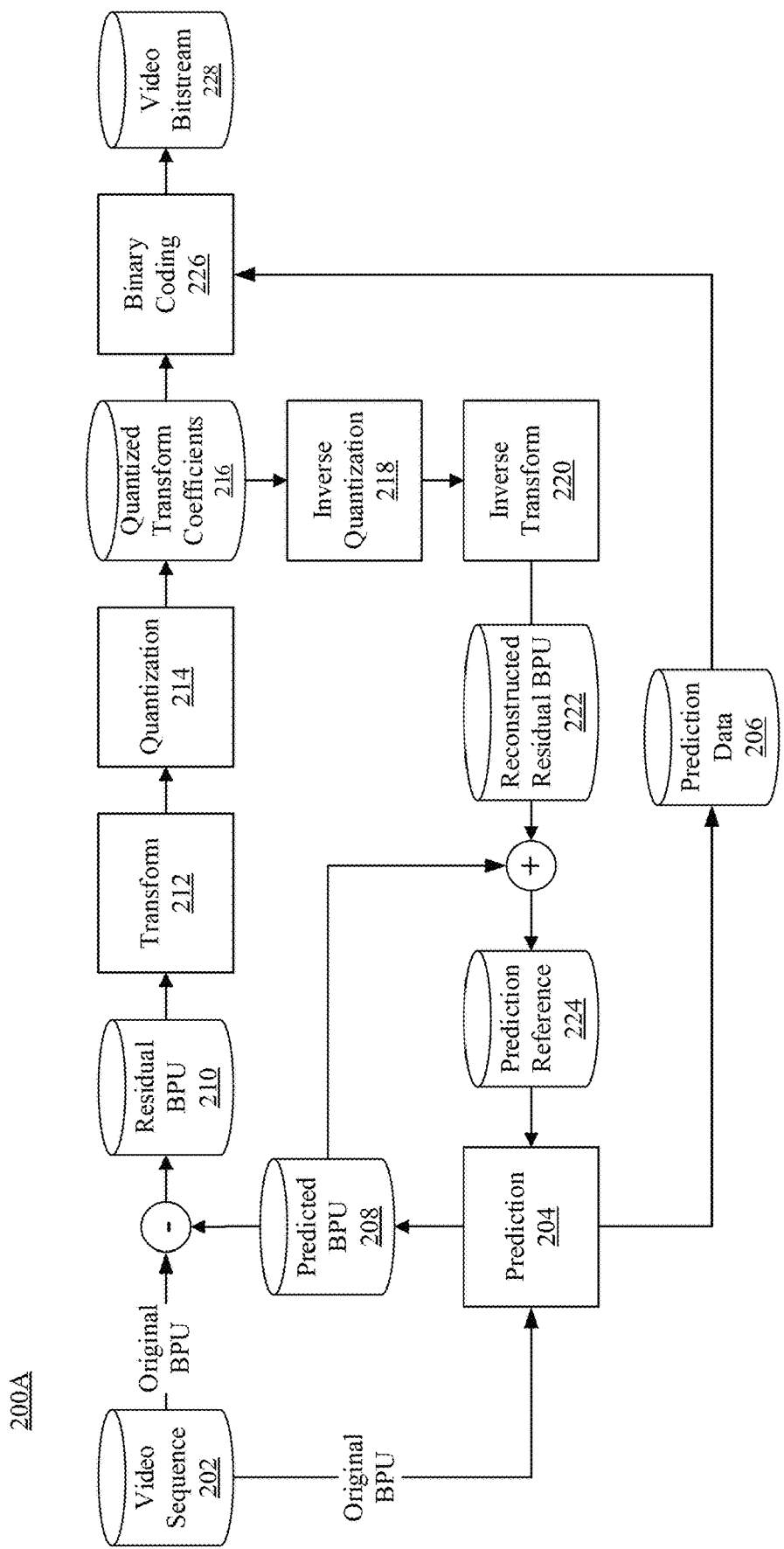
FIG. 2A is a schematic diagram illustrating an exemplary encoding process performed by a hybrid video coding system, consistent with embodiments of the disclosure.
Figure 2B:
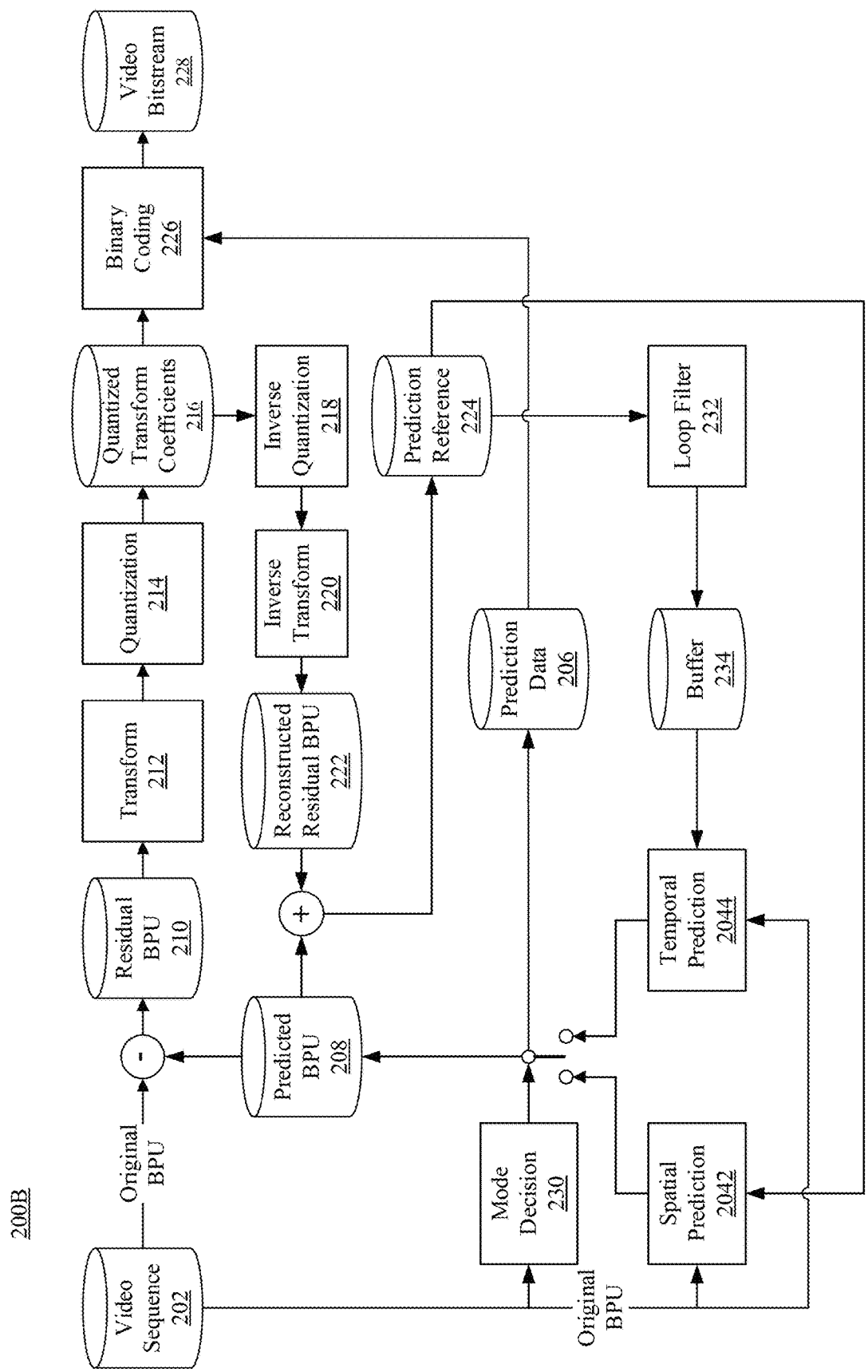
FIG. 2B is a schematic diagram illustrating another exemplary encoding process performed by a hybrid video coding system, consistent with embodiments of the disclosure.

For example, at a mode decision stage (an example of which is shown in FIG. 2B), the encoder can decide what prediction mode (e.g., intra-picture prediction or inter-picture prediction) to use for a basic processing unit, which can be too large to make such a decision. The encoder can split the basic processing unit into multiple basic processing sub-units (e.g., CUs as in H.265/HEVC or H.266/VVC), and decide a prediction type for each individual basic processing sub-unit.

For another example, at a prediction stage (an example of which is shown in FIGS. 2A-2B), the encoder can perform prediction operation at the level of basic processing sub-units (e.g., CUs). However, in some cases, a basic processing sub-unit can still be too large to process. The encoder can further split the basic processing sub-unit into smaller segments (e.g., referred to as "prediction blocks" or "PBs" in H.265/HEVC or H.266/VVC), at the level of which the prediction operation can be performed.

For another example, at a transform stage (an example of which is shown in FIGS. 2A-2B), the encoder can perform a transform operation for residual basic processing sub-units (e.g., CUs). However, in some cases, a basic processing sub-unit can still be too large to process. The encoder can further split the basic processing sub-unit into smaller segments (e.g., referred to as "transform blocks" or "TBs" in H.265/HEVC or H.266/VVC), at the level of which the transform operation can be performed. It should be noted that the division schemes of the same basic processing sub-unit can be different at the prediction stage and the transform stage. For example, in H.265/HEVC or H.266/VVC, the prediction blocks and transform blocks of the same CU can have different sizes and numbers.

In structure 110 of FIG. 1, basic processing unit 112 is further divided into 3×3 basic processing sub-units, the boundaries of which are shown as dotted lines. Different basic processing units of the same picture can be divided into basic processing sub-units in different schemes.

In some implementations, to provide the capability of parallel processing and error resilience to video encoding and decoding, a picture can be divided into regions for processing, such that, for a region of the picture, the encoding or decoding process can depend on no information from any other region of the picture. In other words, each region of the picture can be processed independently. By doing so, the codec can process different regions of a picture in parallel, thus increasing the coding efficiency. Also, when data of a region is corrupted in the processing or lost in network transmission, the codec can correctly encode or decode other regions of the same picture without reliance on the corrupted or lost data, thus providing the capability of error resilience. In some video coding standards, a picture can be divided into different types of regions. For example, H.265/HEVC and H.266/VVC provide two types of regions: "slices" and "tiles." It should also be noted that different pictures of video sequence 100 can have different partition schemes for dividing a picture into regions.

For example, in FIG. 1, structure 110 is divided into three regions 114, 116, and 118, the boundaries of which are shown as solid lines inside structure 110. Region 114 includes four basic processing units. Each of regions 116 and 118 includes six basic processing units. It should be noted that the basic processing units, basic processing sub-units, and regions of structure 110 in FIG. 1 are only examples, and the present disclosure does not limit embodiments thereof.

FIG. 2A illustrates a schematic diagram of an example encoding process 200A, consistent with embodiments of the disclosure. For example, the encoding process 200A can be performed by an encoder. As shown in FIG. 2A, the encoder can encode video sequence 202 into video bitstream 228 according to process 200A. Similar to video sequence 100 in FIG. 1, video sequence 202 can include a set of pictures (referred to as "original pictures") arranged in a temporal order. Similar to structure 110 in FIG. 1, each original picture of video sequence 202 can be divided by the encoder into basic processing units, basic processing sub-units, or regions for processing. In some embodiments, the encoder can perform process 200A at the level of basic processing units for each original picture of video sequence 202. For example, the encoder can perform process 200A in an iterative manner, in which the encoder can encode a basic processing unit in one iteration of process 200A. In some embodiments, the encoder can perform process 200A in parallel for regions (e.g., regions 114-118) of each original picture of video sequence 202.

In FIG. 2A, the encoder can feed a basic processing unit (referred to as an "original BPU") of an original picture of video sequence 202 to prediction stage 204 to generate prediction data 206 and predicted BPU 208. The encoder can subtract predicted BPU 208 from the original BPU to generate residual BPU 210. The encoder can feed residual BPU 210 to transform stage 212 and quantization stage 214 to generate quantized transform coefficients 216. The encoder can feed prediction data 206 and quantized transform coefficients 216 to binary coding stage 226 to generate video bitstream 228. Components 202, 204, 206, 208, 210, 212, 214, 216, 226, and 228 can be referred to as a "forward path." During process 200A, after quantization stage 214, the encoder can feed quantized transform coefficients 216 to inverse quantization stage 218 and inverse transform stage 220 to generate reconstructed residual BPU 222. The encoder can add reconstructed residual BPU 222 to predicted BPU 208 to generate prediction reference 224, which is used in prediction stage 204 for the next iteration of process 200A. Components 218, 220, 222, and 224 of process 200A can be referred to as a "reconstruction path." The reconstruction path can be used to ensure that both the encoder and the decoder use the same reference data for prediction.

The encoder can perform process 200A iteratively to encode each original BPU of the original picture (in the forward path) and generate predicted reference 224 for encoding the next original BPU of the original picture (in the reconstruction path). After encoding all original BPUs of the original picture, the encoder can proceed to encode the next picture in video sequence 202.

Referring to process 200A, the encoder can receive video sequence 202 generated by a video capturing device (e.g., a camera). The term "receive" used herein can refer to receiving, inputting, acquiring, retrieving, obtaining, reading, accessing, or any action in any manner for inputting data.

At prediction stage 204, at a current iteration, the encoder can receive an original BPU and prediction reference 224, and perform a prediction operation to generate prediction data 206 and predicted BPU 208. Prediction reference 224 can be generated from the reconstruction path of the previous iteration of process 200A. The purpose of prediction stage 204 is to reduce information redundancy by extracting prediction data 206 that can be used to reconstruct the original BPU as predicted BPU 208 from prediction data 206 and prediction reference 224.

Ideally, predicted BPU 208 can be identical to the original BPU. However, due to non-ideal prediction and reconstruction operations, predicted BPU 208 is generally slightly different from the original BPU. For recording such differences, after generating predicted BPU 208, the encoder can subtract it from the original BPU to generate residual BPU 210. For example, the encoder can subtract values (e.g., greyscale values or RGB values) of pixels of predicted BPU 208 from values of corresponding pixels of the original BPU. Each pixel of residual BPU 210 can have a residual value as a result of such subtraction between the corresponding pixels of the original BPU and predicted BPU 208. Compared with the original BPU, prediction data 206 and residual BPU 210 can have fewer bits, but they can be used to reconstruct the original BPU without significant quality deterioration. Thus, the original BPU is compressed.

To further compress residual BPU 210, at transform stage 212, the encoder can reduce spatial redundancy of residual BPU 210 by decomposing it into a set of two-dimensional "base patterns," each base pattern being associated with a "transform coefficient." The base patterns can have the same size (e.g., the size of residual BPU 210). Each base pattern can represent a variation frequency (e.g., frequency of brightness variation) component of residual BPU 210. None of the base patterns can be reproduced from any combinations (e.g., linear combinations) of any other base patterns. In other words, the decomposition can decompose variations of residual BPU 210 into a frequency domain. Such a decomposition is analogous to a discrete Fourier transform of a function, in which the base patterns are analogous to the base functions (e.g., trigonometry functions) of the discrete Fourier transform, and the transform coefficients are analogous to the coefficients associated with the base functions.

Different transform algorithms can use different base patterns. Various transform algorithms can be used at transform stage 212, such as, for example, a discrete cosine transform, a discrete sine transform, or the like. The transform at transform stage 212 is invertible. That is, the encoder can restore residual BPU 210 by an inverse operation of the transform (referred to as an "inverse transform"). For example, to restore a pixel of residual BPU 210, the inverse transform can be multiplying values of corresponding pixels of the base patterns by respective associated coefficients and adding the products to produce a weighted sum. For a video coding standard, both the encoder and decoder can use the same transform algorithm (thus the same base patterns). Thus, the encoder can record only the transform coefficients, from which the decoder can reconstruct residual BPU 210 without receiving the base patterns from the encoder. Compared with residual BPU 210, the transform coefficients can have fewer bits, but they can be used to reconstruct residual BPU 210 without significant quality deterioration. Thus, residual BPU 210 is further compressed.

The encoder can further compress the transform coefficients at quantization stage 214. In the transform process, different base patterns can represent different variation frequencies (e.g., brightness variation frequencies). Because human eyes are generally better at recognizing low-frequency variation, the encoder can disregard information of high-frequency variation without causing significant quality deterioration in decoding. For example, at quantization stage 214, the encoder can generate quantized transform coefficients 216 by dividing each transform coefficient by an integer value (referred to as a "quantization scale factor") and rounding the quotient to its nearest integer. After such an operation, some transform coefficients of the high-frequency base patterns can be converted to zero, and the transform coefficients of the low-frequency base patterns can be converted to smaller integers. The encoder can disregard the zero-value quantized transform coefficients 216, by which the transform coefficients are further compressed. The quantization process is also invertible, in which quantized transform coefficients 216 can be reconstructed to the transform coefficients in an inverse operation of the quantization (referred to as "inverse quantization").

Because the encoder disregards the remainders of such divisions in the rounding operation, quantization stage 214 can be lossy. Typically, quantization stage 214 can contribute the most information loss in process 200A. The larger the information loss is, the fewer bits the quantized transform coefficients 216 can need. For obtaining different levels of information loss, the encoder can use different values of the quantization parameter or any other parameter of the quantization process.

At binary coding stage 226, the encoder can encode prediction data 206 and quantized transform coefficients 216 using a binary coding technique, such as, for example, entropy coding, variable length coding, arithmetic coding, Huffman coding, context-adaptive binary arithmetic coding, or any other lossless or lossy compression algorithm. In some embodiments, besides prediction data 206 and quantized transform coefficients 216, the encoder can encode other information at binary coding stage 226, such as, for example, a prediction mode used at prediction stage 204, parameters of the prediction operation, a transform type at transform stage 212, parameters of the quantization process (e.g., quantization parameters), an encoder control parameter (e.g., a bitrate control parameter), or the like. The encoder can use the output data of binary coding stage 226 to generate video bitstream 228. In some embodiments, video bitstream 228 can be further packetized for network transmission.

Referring to the reconstruction path of process 200A, at inverse quantization stage 218, the encoder can perform inverse quantization on quantized transform coefficients 216 to generate reconstructed transform coefficients. At inverse transform stage 220, the encoder can generate reconstructed residual BPU 222 based on the reconstructed transform coefficients. The encoder can add reconstructed residual BPU 222 to predicted BPU 208 to generate prediction reference 224 that is to be used in the next iteration of process 200A.

It should be noted that other variations of the process 200A can be used to encode video sequence 202. In some embodiments, stages of process 200A can be performed by the encoder in different orders. In some embodiments, one or more stages of process 200A can be combined into a single stage. In some embodiments, a single stage of process 200A can be divided into multiple stages. For example, transform stage 212 and quantization stage 214 can be combined into a single stage. In some embodiments, process 200A can include additional stages. In some embodiments, process 200A can omit one or more stages in FIG. 2A.

FIG. 2B illustrates a schematic diagram of another example encoding process 200B, consistent with embodiments of the disclosure. Process 200B can be modified from process 200A. For example, process 200B can be used by an encoder conforming to a hybrid video coding standard (e.g., H.26x series). Compared with process 200A, the forward path of process 200B additionally includes mode decision stage 230 and divides prediction stage 204 into spatial prediction stage 2042 and temporal prediction stage 2044. The reconstruction path of process 200B additionally includes loop filter stage 232 and buffer 234.

Generally, prediction techniques can be categorized into two types: spatial prediction and temporal prediction. Spatial prediction (e.g., an intra-picture prediction or "intra prediction") can use pixels from one or more already coded neighboring BPUs in the same picture to predict the current BPU. That is, prediction reference 224 in the spatial prediction can include the neighboring BPUs. The spatial prediction can reduce the inherent spatial redundancy of the picture. Temporal prediction (e.g., an inter-picture prediction or "inter prediction") can use regions from one or more already coded pictures to predict the current BPU. That is, prediction reference 224 in the temporal prediction can include the coded pictures. The temporal prediction can reduce the inherent temporal redundancy of the pictures.

Referring to process 200B, in the forward path, the encoder performs the prediction operation at spatial prediction stage 2042 and temporal prediction stage 2044. For example, at spatial prediction stage 2042, the encoder can perform the intra prediction. For an original BPU of a picture being encoded, prediction reference 224 can include one or more neighboring BPUs that have been encoded (in the forward path) and reconstructed (in the reconstructed path) in the same picture. The encoder can generate predicted BPU 208 by extrapolating the neighboring BPUs. The extrapolation technique can include, for example, a linear extrapolation or interpolation, a polynomial extrapolation or interpolation, or the like. In some embodiments, the encoder can perform the extrapolation at the pixel level, such as by extrapolating values of corresponding pixels for each pixel of predicted BPU 208. The neighboring BPUs used for extrapolation can be located with respect to the original BPU from various directions, such as in a vertical direction (e.g., on top of the original BPU), a horizontal direction (e.g., to the left of the original BPU), a diagonal direction (e.g., to the down-left, down-right, up-left, or up-right of the original BPU), or any direction defined in the used video coding standard. For the intra prediction, prediction data 206 can include, for example, locations (e.g., coordinates) of the used neighboring BPUs, sizes of the used neighboring BPUs, parameters of the extrapolation, a direction of the used neighboring BPUs with respect to the original BPU, or the like.

For another example, at temporal prediction stage 2044, the encoder can perform the inter prediction. For an original BPU of a current picture, prediction reference 224 can include one or more pictures (referred to as "reference pictures") that have been encoded (in the forward path) and reconstructed (in the reconstructed path). In some embodiments, a reference picture can be encoded and reconstructed BPU by BPU. For example, the encoder can add reconstructed residual BPU 222 to predicted BPU 208 to generate a reconstructed BPU. When all reconstructed BPUs of the same picture are generated, the encoder can generate a reconstructed picture as a reference picture. The encoder can perform an operation of "motion estimation" to search for a matching region in a scope (referred to as a "search window") of the reference picture. The location of the search window in the reference picture can be determined based on the location of the original BPU in the current picture. For example, the search window can be centered at a location having the same coordinates in the reference picture as the original BPU in the current picture and can be extended out for a predetermined distance. When the encoder identifies (e.g., by using a pel-recursive algorithm, a block-matching algorithm, or the like) a region similar to the original BPU in the search window, the encoder can determine such a region as the matching region. The matching region can have different dimensions (e.g., being smaller than, equal to, larger than, or in a different shape) from the original BPU. Because the reference picture and the current picture are temporally separated in the timeline (e.g., as shown in FIG. 1), it can be deemed that the matching region "moves" to the location of the original BPU as time goes by. The encoder can record the direction and distance of such a motion as a "motion vector." When multiple reference pictures are used (e.g., as picture 106 in FIG. 1), the encoder can search for a matching region and determine its associated motion vector for each reference picture. In some embodiments, the encoder can assign weights to pixel values of the matching regions of respective matching reference pictures.

The motion estimation can be used to identify various types of motions, such as, for example, translations, rotations, zooming, or the like. For inter prediction, prediction data 206 can include, for example, locations (e.g., coordinates) of the matching region, the motion vectors associated with the matching region, the number of reference pictures, weights associated with the reference pictures, or the like.

For generating predicted BPU 208, the encoder can perform an operation of "motion compensation." The motion compensation can be used to reconstruct predicted BPU 208 based on prediction data 206 (e.g., the motion vector) and prediction reference 224. For example, the encoder can move the matching region of the reference picture according to the motion vector, in which the encoder can predict the original BPU of the current picture. When multiple reference pictures are used (e.g., as picture 106 in FIG. 1), the encoder can move the matching regions of the reference pictures according to the respective motion vectors and average pixel values of the matching regions. In some embodiments, if the encoder has assigned weights to pixel values of the matching regions of respective matching reference pictures, the encoder can add a weighted sum of the pixel values of the moved matching regions.

In some embodiments, the inter prediction can be unidirectional or bidirectional. Unidirectional inter predictions can use one or more reference pictures in the same temporal direction with respect to the current picture. For example, picture 104 in FIG. 1 is a unidirectional inter-predicted picture, in which the reference picture (e.g., picture 102) precedes picture 104. Bidirectional inter predictions can use one or more reference pictures at both temporal directions with respect to the current picture. For example, picture 106 in FIG. 1 is a bidirectional inter-predicted picture, in which the reference pictures (e.g., pictures 104 and 108) are at both temporal directions with respect to picture 104.

Still referring to the forward path of process 200B, after spatial prediction 2042 and temporal prediction stage 2044, at mode decision stage 230, the encoder can select a prediction mode (e.g., one of the intra prediction or the inter prediction) for the current iteration of process 200B. For example, the encoder can perform a rate-distortion optimization technique, in which the encoder can select a prediction mode to minimize a value of a cost function depending on a bit rate of a candidate prediction mode and distortion of the reconstructed reference picture under the candidate prediction mode. Depending on the selected prediction mode, the encoder can generate the corresponding predicted BPU 208 and predicted data 206.

In the reconstruction path of process 200B, if intra prediction mode has been selected in the forward path, after generating prediction reference 224 (e.g., the current BPU that has been encoded and reconstructed in the current picture), the encoder can directly feed prediction reference 224 to spatial prediction stage 2042 for later usage (e.g., for extrapolation of a next BPU of the current picture). The encoder can feed prediction reference 224 to loop filter stage 232, at which the encoder can apply a loop filter to prediction reference 224 to reduce or eliminate distortion (e.g., blocking artifacts) introduced during coding of the prediction reference 224. The encoder can apply various loop filter techniques at loop filter stage 232, such as, for example, deblocking, sample adaptive offsets, adaptive loop filters, or the like. The loop-filtered reference picture can be stored in buffer 234 (or "decoded picture buffer") for later use (e.g., to be used as an inter-prediction reference picture for a future picture of video sequence 202). The encoder can store one or more reference pictures in buffer 234 to be used at temporal prediction stage 2044. In some embodiments, the encoder can encode parameters of the loop filter (e.g., a loop filter strength) at binary coding stage 226, along with quantized transform coefficients 216, prediction data 206, and other information.

Figure 3A:
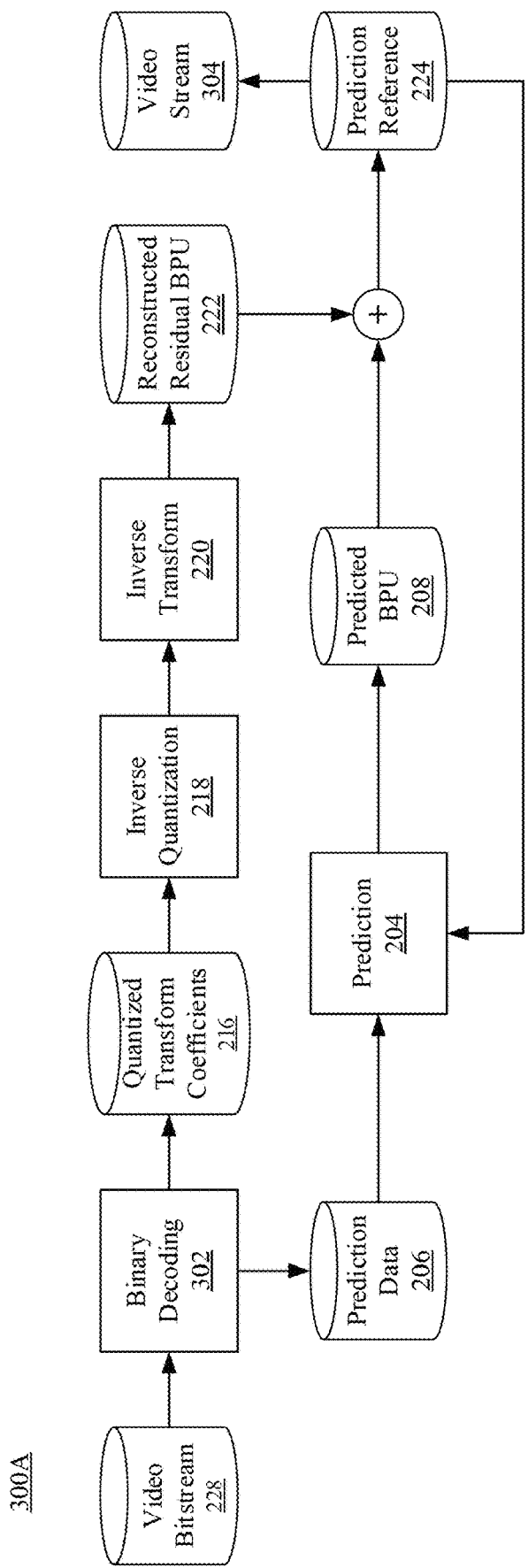
FIG. 3A is a schematic diagram illustrating an exemplary decoding process performed by a hybrid video coding system, consistent with embodiments of the disclosure.

FIG. 3A illustrates a schematic diagram of an example decoding process 300A, consistent with embodiments of the disclosure. Process 300A can be a decompression process corresponding to the compression process 200A in FIG. 2A. In some embodiments, process 300A can be similar to the reconstruction path of process 200A. A decoder can decode video bitstream 228 into video stream 304 according to process 300A. Video stream 304 can be very similar to video sequence 202. However, due to the information loss in the compression and decompression process (e.g., quantization stage 214 in FIGS. 2A-2B), generally, video stream 304 is not identical to video sequence 202. Similar to processes 200A and 200B in FIGS. 2A-2B, the decoder can perform process 300A at the level of basic processing units (BPUs) for each picture encoded in video bitstream 228. For example, the decoder can perform process 300A in an iterative manner, in which the decoder can decode a basic processing unit in one iteration of process 300A. In some embodiments, the decoder can perform process 300A in parallel for regions (e.g., regions 114-118) of each picture encoded in video bitstream 228.

In FIG. 3A, the decoder can feed a portion of video bitstream 228 associated with a basic processing unit (referred to as an "encoded BPU") of an encoded picture to binary decoding stage 302. At binary decoding stage 302, the decoder can decode the portion into prediction data 206 and quantized transform coefficients 216. The decoder can feed quantized transform coefficients 216 to inverse quantization stage 218 and inverse transform stage 220 to generate reconstructed residual BPU 222. The decoder can feed prediction data 206 to prediction stage 204 to generate predicted BPU 208. The decoder can add reconstructed residual BPU 222 to predicted BPU 208 to generate predicted reference 224. In some embodiments, predicted reference 224 can be stored in a buffer (e.g., a decoded picture buffer in a computer memory). The decoder can feed predicted reference 224 to prediction stage 204 for performing a prediction operation in the next iteration of process 300A.

The decoder can perform process 300A iteratively to decode each encoded BPU of the encoded picture and generate predicted reference 224 for encoding the next encoded BPU of the encoded picture. After decoding all encoded BPUs of the encoded picture, the decoder can output the picture to video stream 304 for display and proceed to decode the next encoded picture in video bitstream 228.

At binary decoding stage 302, the decoder can perform an inverse operation of the binary coding technique used by the encoder (e.g., entropy coding, variable length coding, arithmetic coding, Huffman coding, context-adaptive binary arithmetic coding, or any other lossless compression algorithm). In some embodiments, besides prediction data 206 and quantized transform coefficients 216, the decoder can decode other information at binary decoding stage 302, such as, for example, a prediction mode, parameters of the prediction operation, a transform type, parameters of the quantization process (e.g., quantization parameters), an encoder control parameter (e.g., a bitrate control parameter), or the like. In some embodiments, if video bitstream 228 is transmitted over a network in packets, the decoder can depacketize video bitstream 228 before feeding it to binary decoding stage 302.

Figure 3B:
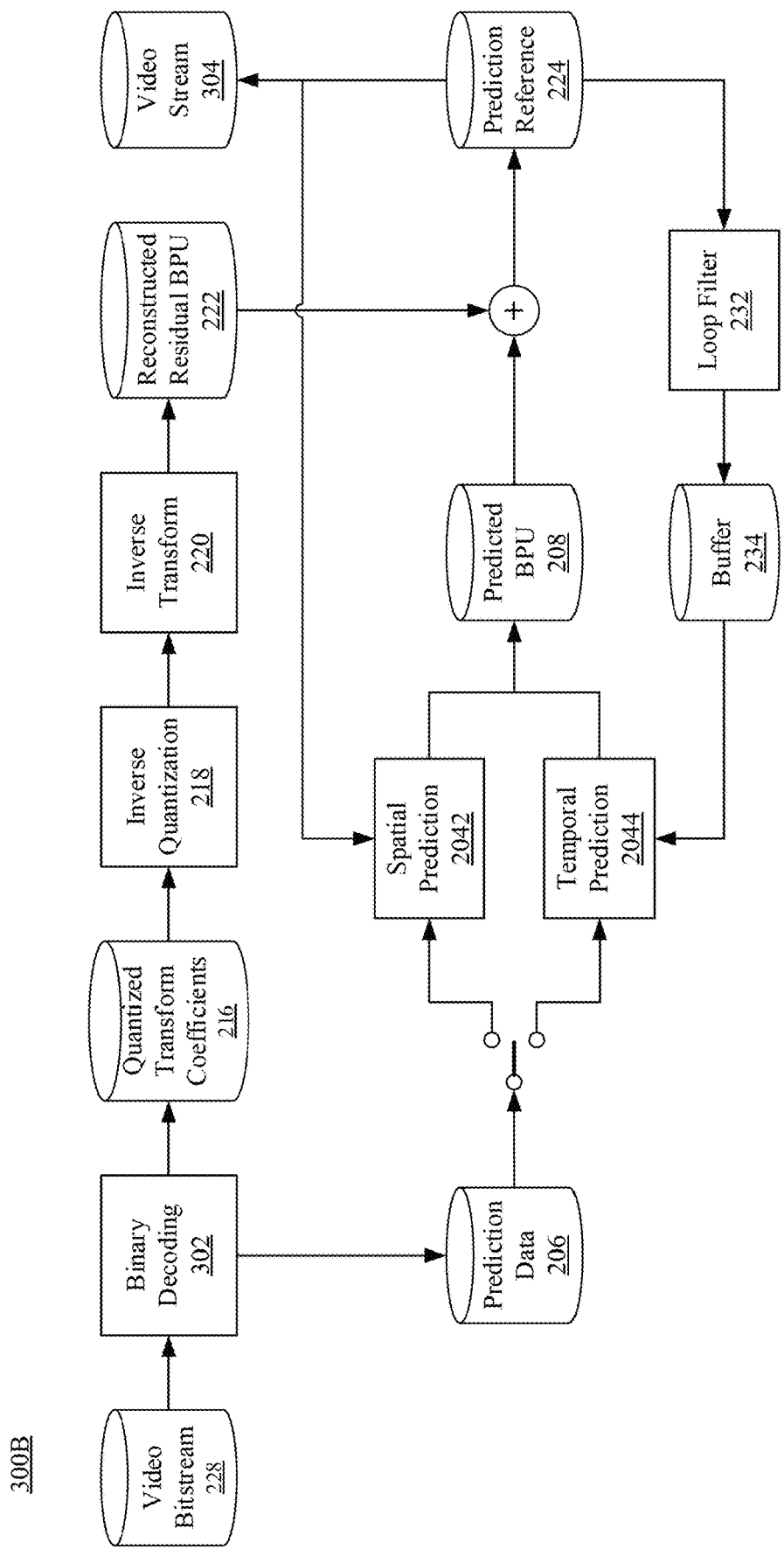
FIG. 3B is a schematic diagram illustrating another exemplary decoding process performed by a hybrid video coding system, consistent with embodiments of the disclosure.

FIG. 3B illustrates a schematic diagram of another example decoding process 300B, consistent with embodiments of the disclosure. Process 300B can be modified from process 300A. For example, process 300B can be used by a decoder conforming to a hybrid video coding standard (e.g., H.26x series). Compared with process 300A, process 300B additionally divides prediction stage 204 into spatial prediction stage 2042 and temporal prediction stage 2044, and additionally includes loop filter stage 232 and buffer 234.

In process 300B, for an encoded basic processing unit (referred to as a "current BPU") of an encoded picture (referred to as a "current picture") that is being decoded, prediction data 206 decoded from binary decoding stage 302 by the decoder can include various types of data, depending on what prediction mode was used to encode the current BPU by the encoder. For example, if intra prediction was used by the encoder to encode the current BPU, prediction data 206 can include a prediction mode indicator (e.g., a flag value) indicative of the intra prediction, parameters of the intra prediction operation, or the like. The parameters of the intra prediction operation can include, for example, locations (e.g., coordinates) of one or more neighboring BPUs used as a reference, sizes of the neighboring BPUs, parameters of extrapolation, a direction of the neighboring BPUs with respect to the original BPU, or the like. For another example, if inter prediction was used by the encoder to encode the current BPU, prediction data 206 can include a prediction mode indicator (e.g., a flag value) indicative of the inter prediction, parameters of the inter prediction operation, or the like. The parameters of the inter prediction operation can include, for example, the number of reference pictures associated with the current BPU, weights respectively associated with the reference pictures, locations (e.g., coordinates) of one or more matching regions in the respective reference pictures, one or more motion vectors respectively associated with the matching regions, or the like.

Based on the prediction mode indicator, the decoder can decide whether to perform a spatial prediction (e.g., the intra prediction) at spatial prediction stage 2042 or a temporal prediction (e.g., the inter prediction) at temporal prediction stage 2044. The details of performing such spatial prediction or temporal prediction are described in FIG. 2B and will not be repeated hereinafter. After performing such spatial prediction or temporal prediction, the decoder can generate predicted BPU 208. The decoder can add predicted BPU 208 and reconstructed residual BPU 222 to generate prediction reference 224, as described in FIG. 3A.

In process 300B, the decoder can feed predicted reference 224 to spatial prediction stage 2042 or temporal prediction stage 2044 for performing a prediction operation in the next iteration of process 300B. For example, if the current BPU is decoded using the intra prediction at spatial prediction stage 2042, after generating prediction reference 224 (e.g., the decoded current BPU), the decoder can directly feed prediction reference 224 to spatial prediction stage 2042 for later usage (e.g., for extrapolation of a next BPU of the current picture). If the current BPU is decoded using the inter prediction at temporal prediction stage 2044, after generating prediction reference 224 (e.g., a reference picture in which all BPUs have been decoded), the decoder can feed prediction reference 224 to loop filter stage 232 to reduce or eliminate distortion (e.g., blocking artifacts). The decoder can apply a loop filter to prediction reference 224, in a way as described in FIG. 2B. The loop-filtered reference picture can be stored in buffer 234 (e.g., a decoded picture buffer in a computer memory) for later use (e.g., to be used as an inter-prediction reference picture for a future encoded picture of video bitstream 228). The decoder can store one or more reference pictures in buffer 234 to be used at temporal prediction stage 2044. In some embodiments, prediction data can further include parameters of the loop filter (e.g., a loop filter strength). In some embodiments, prediction data includes parameters of the loop filter when the prediction mode indicator of prediction data 206 indicates that inter prediction was used to encode the current BPU.

Figure 4:
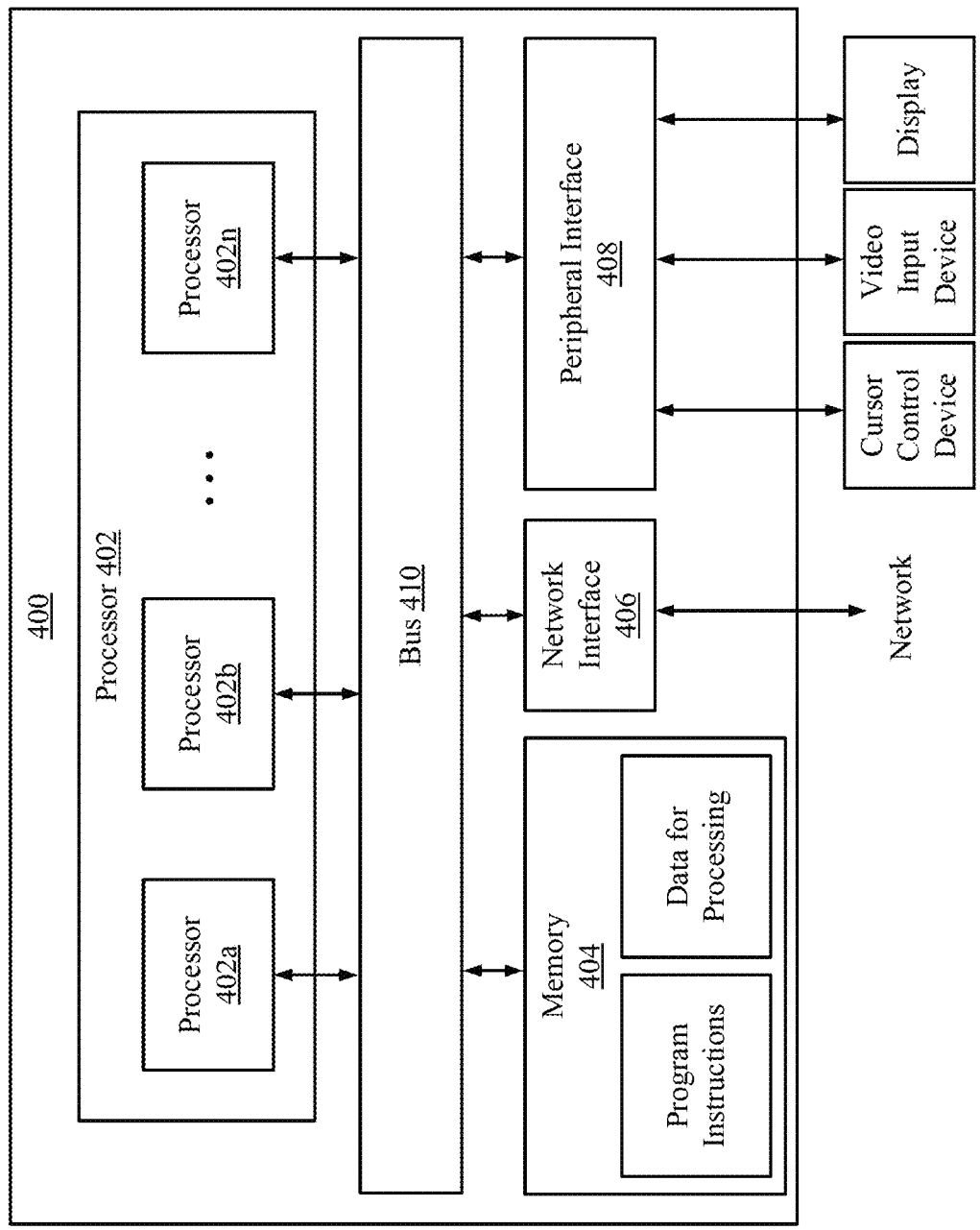
FIG. 4 is a block diagram of an exemplary apparatus for encoding or decoding video data, according to some embodiments of the present disclosure.

FIG. 4 is a block diagram of an example apparatus 400 for encoding or decoding video data, consistent with embodiments of the disclosure. As shown in FIG. 4, apparatus 400 can include processor 402. When processor 402 executes instructions described herein, apparatus 400 can become a specialized machine for video encoding or decoding. Processor 402 can be any type of circuitry capable of manipulating or processing information. For example, processor 402 can include any combination of any number of a central processing unit (or "CPU"), a graphics processing unit (or "GPU"), a neural processing unit ("NPU"), a microcontroller unit ("MCU"), an optical processor, a programmable logic controller, a microcontroller, a microprocessor, a digital signal processor, an intellectual property (IP) core, a Programmable Logic Array (PLA), a Programmable Array Logic (PAL), a Generic Array Logic (GAL), a Complex Programmable Logic Device (CPLD), a Field-Programmable Gate Array (FPGA), a System On Chip (SoC), an Application-Specific Integrated Circuit (ASIC), or the like. In some embodiments, processor 402 can also be a set of processors grouped as a single logical component. For example, as shown in FIG. 4, processor 402 can include multiple processors, including processor 402a, processor 402b, and processor 402n.

Apparatus 400 can also include memory 404 configured to store data (e.g., a set of instructions, computer codes, intermediate data, or the like). For example, as shown in FIG. 4, the stored data can include program instructions (e.g., program instructions for implementing the stages in processes 200A, 200B, 300A, or 300B) and data for processing (e.g., video sequence 202, video bitstream 228, or video stream 304). Processor 402 can access the program instructions and data for processing (e.g., via bus 410), and execute the program instructions to perform an operation or manipulation on the data for processing. Memory 404 can include a high-speed random-access storage device or a non-volatile storage device. In some embodiments, memory 404 can include any combination of any number of a random-access memory (RAM), a read-only memory (ROM), an optical disc, a magnetic disk, a hard drive, a solid-state drive, a flash drive, a security digital (SD) card, a memory stick, a compact flash (CF) card, or the like. Memory 404 can also be a group of memories (not shown in FIG. 4) grouped as a single logical component.

Bus 410 can be a communication device that transfers data between components inside apparatus 400, such as an internal bus (e.g., a CPU-memory bus), an external bus (e.g., a universal serial bus port, a peripheral component interconnect express port), or the like.

For ease of explanation without causing ambiguity, processor 402 and other data processing circuits are collectively referred to as a "data processing circuit" in this disclosure. The data processing circuit can be implemented entirely as hardware, or as a combination of software, hardware, or firmware. In addition, the data processing circuit can be a single independent module or can be combined entirely or partially into any other component of apparatus 400.

Apparatus 400 can further include network interface 406 to provide wired or wireless communication with a network (e.g., the Internet, an intranet, a local area network, a mobile communications network, or the like). In some embodiments, network interface 406 can include any combination of any number of a network interface controller (NIC), a radio frequency (RF) module, a transponder, a transceiver, a modem, a router, a gateway, a wired network adapter, a wireless network adapter, a Bluetooth adapter, an infrared adapter, a near-field communication ("NFC") adapter, a cellular network chip, or the like.

In some embodiments, optionally, apparatus 400 can further include peripheral interface 408 to provide a connection to one or more peripheral devices. As shown in FIG. 4, the peripheral device can include, but is not limited to, a cursor control device (e.g., a mouse, a touchpad, or a touchscreen), a keyboard, a display (e.g., a cathode-ray tube display, a liquid crystal display, or a light-emitting diode display), a video input device (e.g., a camera or an input interface coupled to a video archive), or the like.

It should be noted that video codecs (e.g., a codec performing process 200A, 200B, 300A, or 300B) can be implemented as any combination of any software or hardware modules in apparatus 400. For example, some or all stages of process 200A, 200B, 300A, or 300B can be implemented as one or more software modules of apparatus 400, such as program instructions that can be loaded into memory 404. For another example, some or all stages of process 200A, 200B, 300A, or 300B can be implemented as one or more hardware modules of apparatus 400, such as a specialized data processing circuit (e.g., an FPGA, an ASIC, an NPU, or the like).

The key idea of sample adaptive offset (SAO) in video processing technologies (e.g., AVS3) is classifying samples into different categories, obtaining an offset for each category, and then adding the offset to each sample. The index of the classification methods and the offsets of each category are signaled for each Coding Tree Unit (CTU), such that SAO parameters are adapted from CTU to CTU.

There are two types of classification methods: edge offset (EO) and band offset (BO). For EO, the sample classification is based on comparison between the current sample value and neighboring sample values. For BO, the sample classification is based on the sample value band.

Figure 5:
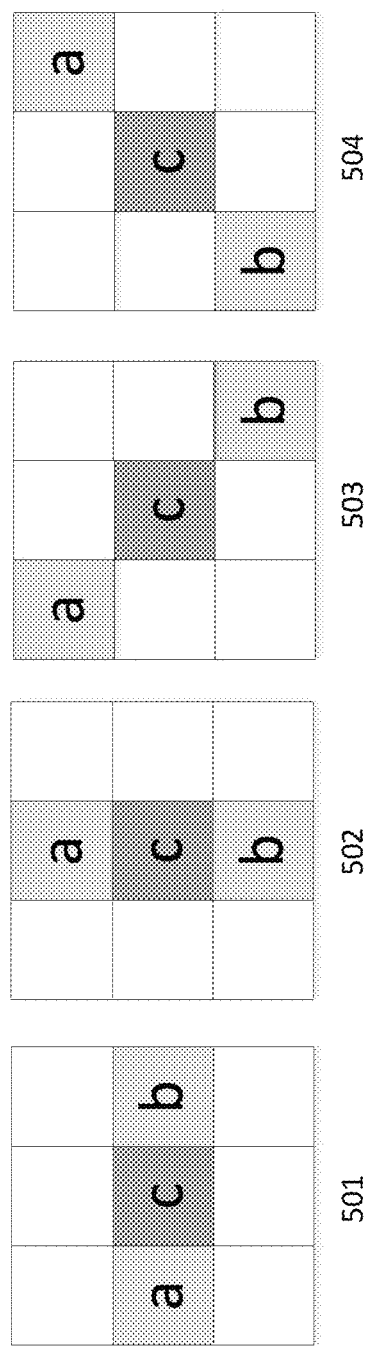
FIG. 5 illustrates four Edge Offset (EO) patterns used in Sample Adaptive Offset (SAO), according to some embodiments of the present disclosure.

For EO, each sample in a CTU is classified into one of five categories based on the current sample and the neighbors. FIG. 5 illustrates four Edge Offset (EO) patterns used in Sample Adaptive Offset (SAO), according to some embodiments of the present disclosure. As shown in FIG. 5, there are 4 EO patterns 501-504, in which "c" represents the current sample, and "a" and "b" represent two neighboring samples. Table 1 shows exemplary classification rules for determining the category for each sample and the offset range.

TABLE 1

Exemplary classification rules and offset ranges of EO in SAO

| Category | Condition | Offset Range |
|---|---|---|
| 1 | c < a && c < b | −1 <= offset <= 6 |
| 2 | (c < a && c == b) \|\| (c == a && c < b) | 0 <= offset <= 1 |
| 3 | (c > a && c == b) \|\| (c == a && c > b) | −1 <= offset <= 0 |
| 4 | c > a && c > b | −6 <= offset <= 1 |
| 0 | None of the above | None |

After a pattern is selected, a category is determined based on the rules in Table 1. Referring to Table 1 and FIG. 5, if the current sample does not belong to EO categories 1 to 4, then the current sample is classified as category 0, and EO is not applied.

For BO, the whole sample value range is equally divided into 32 categories, and offset values are derived for each category and signaled. The range of BO offset is [−7, 7].

In the sequence parameter set (SPS), one flag is used to indicate whether SAO is disabled in the current video sequence. In the slice header, three flags are signaled to indicate whether SAO is enabled for Y, Cb and Cr in the current slice. If SAO is enabled in the current slice, SAO parameters (including merging information, mode information, and offset information) for each CTU are signaled. For each CTU, the SAO parameters of the left CTU or above CTU can be reused. If the current CTU does not merge with a neighboring CTU, the mode and offset information of the current CTU is signaled for luma, Cb and Cr in sequence. For each component, the SAO mode is first signaled to indicate which of the EO, BO, and OFF is selected. If BO is selected, 32 offsets are signaled; if EO is selected, 4 offsets followed by one of the four EO patterns are signaled. According to some embodiments of the present disclosure, only the offsets of some consecutive bands will be signaled when BO is selected.

Moreover, an enhanced Sample Adaptive Offset (ESAO) is adopted in AVS3. When ESAO is enabled in SPS, SAO is set to be disabled. ESAO modifies the classification methods of SAO and uses the same ESAO parameters for the whole frame. The classification methods for luma and chroma are different for ESAO.

Figure 6:
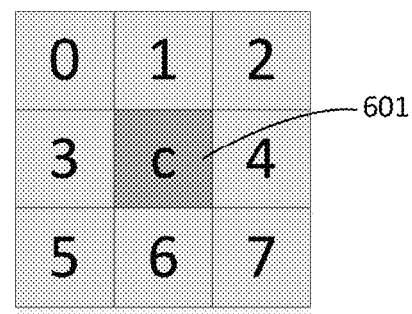
FIG. 6 illustrates a current luma sample and its eight surrounding samples, according to some embodiments of the present disclosure.

For luma, the classification method is based on two dimensions. For a first dimension, the reconstructed luma samples are divided into $N_{EO}$ categories with two enhanced EO methods. FIG. 6 illustrates a current luma sample and eight surrounding samples of the luma sample, according to some embodiments of the present disclosure. As shown in FIG. 6, the value c of current luma sample 601 is compared with the surrounding 8 samples with index from 0 to 7, consecutively. Table 2 shows the exemplary classification results idx_EO of the first dimension by two methods, where $Y_{(i,j)}$ is the current luma sample and $Y_{(k_1,k_2)}$ means the 8 surrounding luma samples.

TABLE 2

Exemplary classification results of the first dimension in ESAO

| Method 1 | Method 2 |
|---|---|
| Initial: idx_EO = 8; <br> for $\|k_1 - i\| \leq 1$, $\|k_2 - j\| \leq 1$: <br>   if $Y_{(k_1,k_2)} > Y_{(i,j)}$: <br>     idx_EO += 1 <br>   else if $Y_{(k_1,k_2)} < Y_{(i,j)}$: <br>     idx_EO += −1 | Initial: idx_EO = 0; <br> for $\|k_1 - i\| \leq 1$, $\|k_2 - j\| \leq 1$: <br>   if $Y_{(k_1,k_2)} > Y_{(i,j)}$: <br>     idx_EO += 1 |

As shown in Table 2, for Method 1, the range of idx_EO is from 0 to 16, therefore, there are 17 categories in total, (i.e., $N_{EO}$ is equal to 17). For Method 2, the range of idx_EO is from 0 to 8, therefore, there are 9 categories in total, (i.e., $N_{EO}$ is equal to 9). A flag is signaled in picture header (PH) to indicate which of the two methods is used.

For a second dimension, the whole luma sample value range is equally divided into $N_{BO}$ categories, as Equation (1):

$$\text{idx\_BO}=(Y_{(i,j)}*N_{BO})\text{>>bitdepth} \qquad \text{Eq. (1)}$$

where, idx_BO is the classification result of the second dimension, the value of $N_{BO}$ is allowed to change from 1 to 16 for luma samples in AVS3, and bitdepth is the internal coding bit depth.

The final classification result idx_ESAO can be obtained as Equation (2):

$$\text{idx\_ESAO}=\text{idx\_BO}*N_{EO}+\text{idx\_EO} \qquad \text{Eq. (2)}$$

For chroma samples, only the second dimension is used, which means only BO is used. And $N_{BO}$ is allowed to change from 1 to 272 for chroma samples in AVS3.

For example, in AVS3, if ESAO is enabled, a CTU control flag is further signaled to indicate whether the CTUs in the current picture can be enabled/disabled independently. If the CTU control flag indicates the CTUs in the current picture cannot be enabled/disabled independently, e.g., the flag is OFF, ESAO is applied to all CTUs. The ESAO offsets are constrained to be within the range [−15, 15] and are signaled separately for each category in PH with truncated unary code.

Figure 7:
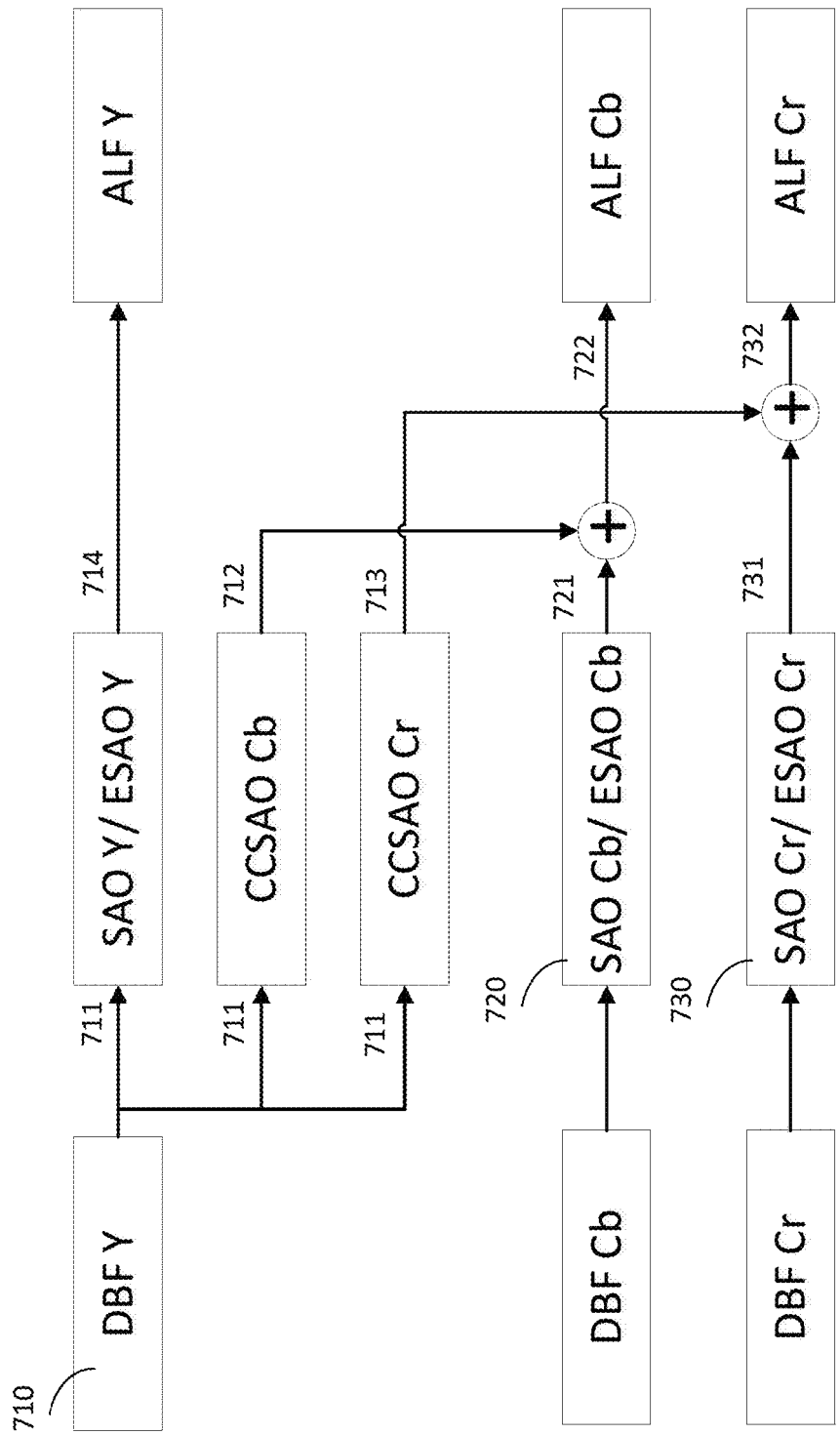
FIG. 7 illustrates a Cross-Component Sample Adaptive Offset (CCSAO) process, according to some embodiments of the present disclosure.

Cross-component Sample Adaptive Offset (CCSAO) is a coding tool to improve the chroma coding efficiency of AVS3. Specifically, for a given chroma sample, the chroma sample is first classified according to a co-located luma sample and then updated by adding one corresponding offset signaled in picture header (PH) on top of the reconstructed value of the chroma sample. FIG. 7 illustrates a Cross-Component Sample Adaptive Offset (CCSAO) process, according to some embodiments of the present disclosure. As shown in FIG. 7, the luma samples 711 output from the de-blocking filter (DBF) 710 are used for the CCSAO classification for chroma samples, and an offset 712, 713 is derived for each category and added to the reconstructed chroma samples 721, 731 output from the Sample Adaptive Offset (SAO) or Enhanced Sample Adaptive Offset (ESAO) 720, 730 to obtain the modified reconstructed chroma samples 722, 732. Then the ALF is performed on the reconstructed luma sample 714 and the modified reconstructed chroma samples 722, 732, respectively.

Figure 8:
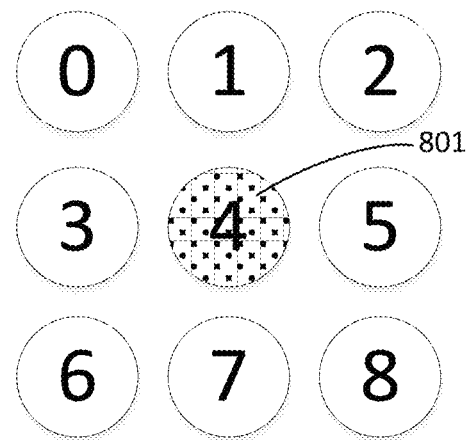
FIG. 8 illustrates nine candidate positions from which a co-located luma sample can be chosen, according to some embodiments of the present disclosure.

In CCSAO, the co-located luma sample is used to classify the current chroma sample. FIG. 8 illustrates 9 candidate positions from which a co-located luma sample can be chosen, according to some embodiments of the present disclosure. As shown in FIG. 8, in a picture, the top-left sample of a picture is at (0, 0), if the current chroma sample is at (i, j), the co-located luma sample is at (2i, 2j), that is the circle in shadow (e.g., 801). A position index (e.g., 4) is signaled in PH to indicate which co-located luma sample is selected.

The band offset (BO) is used to perform classification for CCSAO. Specifically, the range of the reconstructed value associated with a co-located luma sample is equally divided into $N_L$ bands. The value of $N_L$ is allowed to change from 1 to 16 and signaled in PH. For each category, one offset is signaled and added to all the reconstructed chroma samples that fall into the category, according to the following equations:

$$\text{idx}=(Y_{rec}^{dbf}*N_L)\text{>>bitdepth} \qquad \text{Eq. (3)}$$

$$C_{rec}'=C_{rec}+\text{offset[idx]} \qquad \text{Eq. (4)}$$

In Equation (3), $Y_{rec}^{dbf}$ is the reconstructed value associated with the co-located luma sample that is used to classify the current chroma sample, bitdepth is the internal coding bit depth and idx is the category index of the current chroma sample. In Equation (4), $C_{rec}$ and $C_{rec}'$ are the reconstructed values associated with the chroma sample before and after CCSAO, and offset[idx] is the value of CCSAO offset that is applied to idx-th category.

In AVS3, the CCSAO offsets are constrained to be within the range [−15, 15] and are signaled separately in PH with truncated unary code. Additionally, a control flag is firstly signaled in PH to indicate whether CCSAO is enabled to the current picture or not. If the flag is on (i.e., the CCSAO is enabled to the current picture), a second control flag is further signaled to indicate whether to enable CTU on/off control granularity. The CTUs in the current picture can only be enabled/disabled independently when the second flag is on (i.e., the CTU on control is enabled). If the second flag is off (i.e., the CTU off control is enabled), CCSAO is applied to all CTUs according to the first flag.

Figures 9A, 9B:
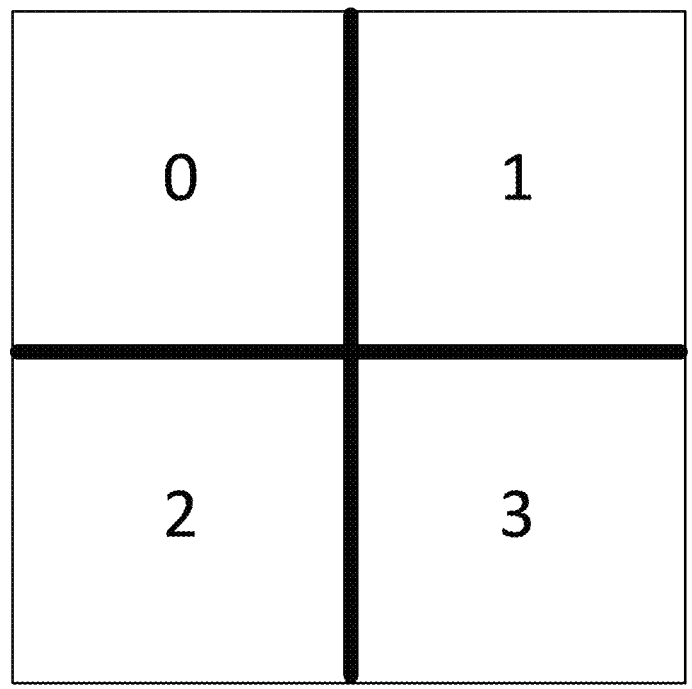
FIG. 9A illustrates a split method of CCSAO-QUA, according to some embodiments of the present disclosure.
FIG. 9B illustrates another split method of CCSAO-QUA, according to some embodiments of the present disclosure.

Two improvement methods for CCSAO quadtree (CCSAO-QUA) can be used to further improve the chroma coding efficiency. FIGS. 9A and 9B illustrate two split methods of CCSAO-QUA respectively, according to some embodiments of the present disclosure.

As shown in FIG. 9A, the first method divides a frame into four regions according to the quadtree. A flag is signaled to indicate whether to split the frame or not and each region can signal different CCSAO parameters (including whether CCSAO is enabled to the current region, whether to enable CTU on/off control, the position of the co-located luma sample, $N_L$ and the offset values of each category). As shown in FIG. 9B, the second method divides a frame into up to 16 regions according to two recursive quadtrees. A flag is signaled to indicate whether to split the frame or not; and if the flag is on, another 4 flags are signaled to indicate whether to further split or not, and each region can signal different CCSAO parameters.

Moreover, multiple classifiers of CCSAO can be signaled in a frame to further improve the chroma coding efficiency, according to some embodiments of the present disclosure. When the CCSAO CTU on control flag is enabled, the number of the classifiers used in this frame is firstly signaled, followed by the parameters for each classifier (including the position of the co-located luma sample, $N_L$ and the offset values of each category). To reduce decoder complexity and give encoder more flexibility, which classifier to be used is explicitly signaled and switched in CTU level. A truncated unary coded index is further signaled to indicate the selected classifier if CCSAO is applied for a CTU.

The following problems are observed in the current CCSAO design in AVS3.

As a first problem, in AVS3, only the reconstructed value associated with the co-located luma sample is used to classify the chroma samples, while the chroma information is not considered. The chroma samples with different values may have similar co-located luma samples so that these chroma samples may be classified into the same category and the offset derived for such categories may be inaccurate.

As a second problem, in AVS3, CCSAO only uses the BO classification method, and equally divides the reconstructed value associated with the co-located luma into up to $N_L$ bands. Therefore, the number of samples in each category may vary greatly, and the relationship between the current sample and the surrounding samples is not considered. This classification method may cause that the derived offset cannot be useful for all of the chroma samples in the same category.

As a third problem, in AVS3, the co-located luma sample of the current chroma sample can be selected from 9 positions. However, these 9 positions may not be suitable for all of the videos.

Figure 10:
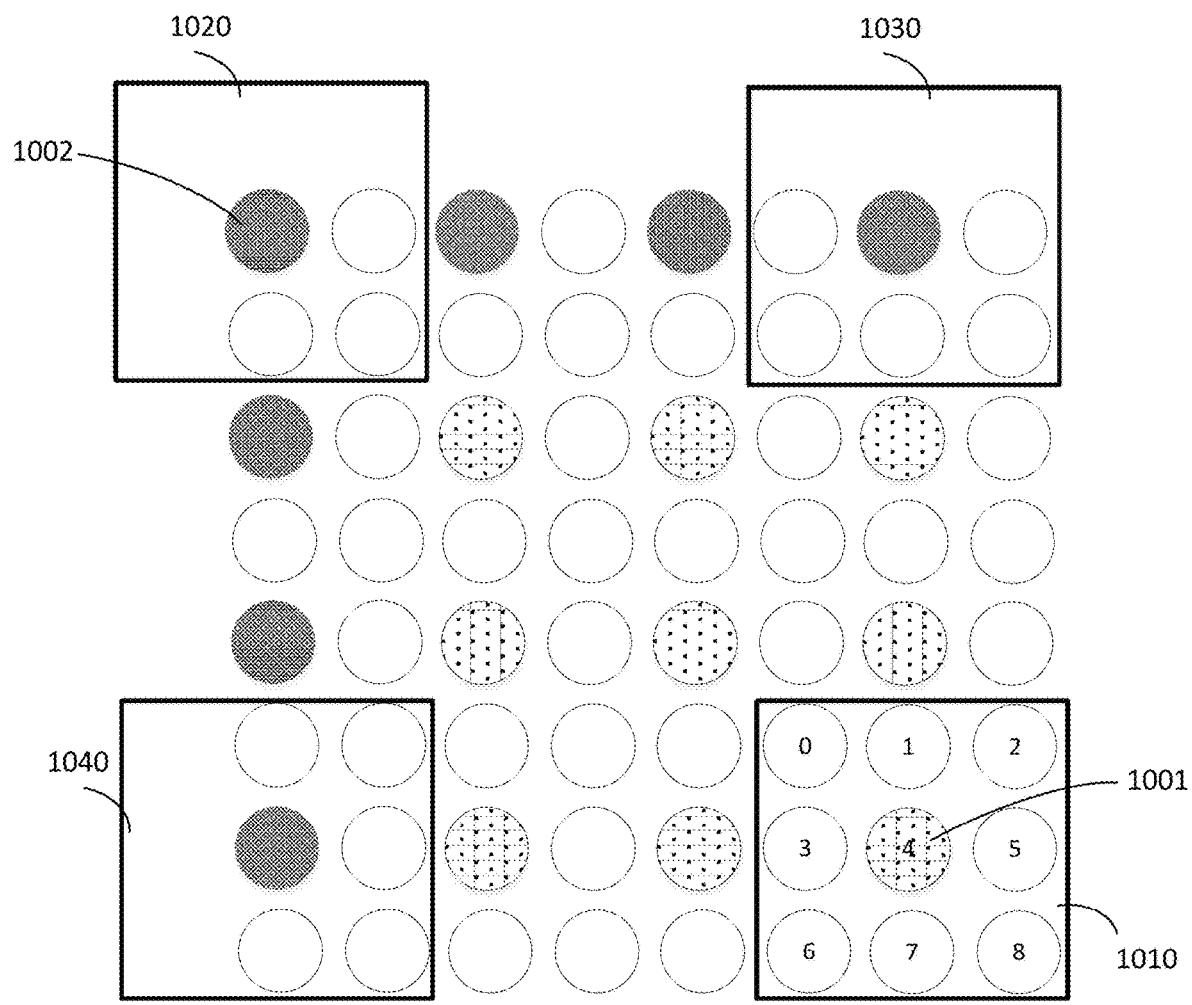
FIG. 10 illustrates co-located luma positions in a picture boundary, according to some embodiments of the present disclosure.

As a fourth problem, in AVS3, for the chroma samples of the first row and first column of a frame, some positions of the 9 positions of the co-located luma samples may not exist, so that CCSAO is not performed for these chroma samples. FIG. 10 illustrates some co-located luma positions in a picture boundary, according to some embodiments of the present disclosure. As shown in FIG. 10, for some chroma samples (e.g., 1001), the 9 positions of co-located luma 1010 are available. But for some chroma samples (e.g., 1002), there are some positions do not exist for the 9 positions of co-located luma (e.g., 1020-1040). Therefore, the CCSAO is not performed for those chroma samples (e.g., 1002). This operation may introduce some additional judgments and affect the performance of CCSAO.

The present disclosure provides methods and systems for solving some or all of the above problems. It is contemplated that the disclosed methods and systems can also solve other problems not explicitly noted in the disclosure, and are not limited to solving the above four problems.

Regarding the first problem, according to some exemplary embodiments, chroma information is introduced to CCSAO classification, such that both the co-located reconstructed luma samples and the reconstructed chroma samples output from the de-blocking filter (DBF) are used for the CCSAO classification.

Figure 11:
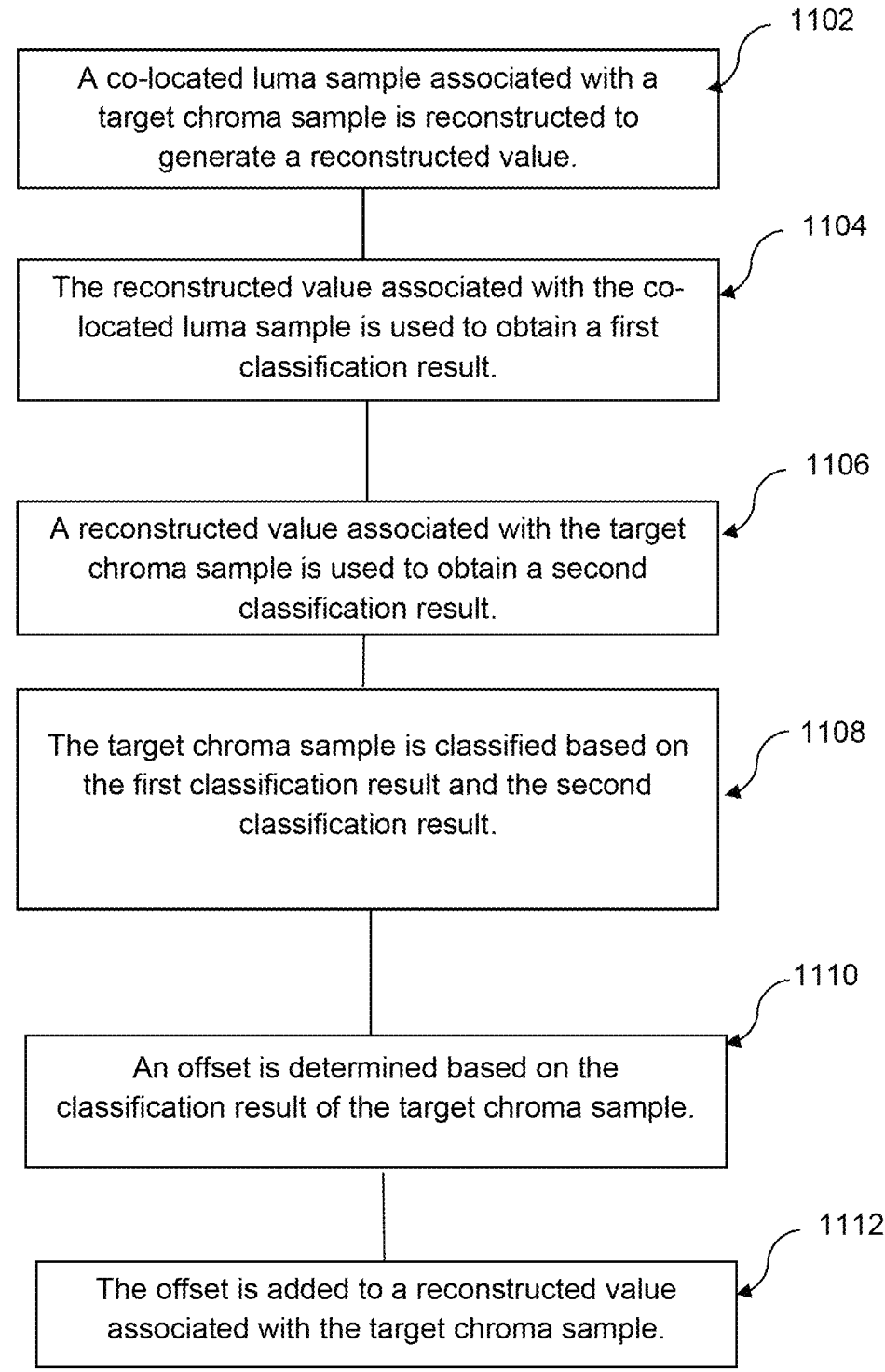
FIG. 11 illustrates a flow chart of a method for CCSAO classification using chroma information, according to some embodiments of the present disclosure.

FIG. 11 illustrates a flow chart of a method 1100 for CCSAO classification using chroma information, according to some embodiments of the present disclosure. Method 1100 can be performed by an encoder (e.g., by process 200A of FIG. 2A or 200B of FIG. 2B), a decoder (e.g., by process 300A of FIG. 3A or 300B of FIG. 3B) or performed by one or more software or hardware components of an apparatus (e.g., apparatus 400 of FIG. 4). For example, a processor (e.g., processor 402 of FIG. 4) can perform method 1100. In some embodiments, method 1100 can be implemented by a computer program product, embodied in a computer-readable medium, including computer-executable instructions, such as program code, executed by computers (e.g., apparatus 400 of FIG. 4). Referring to FIG. 11, method 1100 may include the following steps 1102-1112.

At step 1102, a co-located luma sample associated with a target chroma sample is reconstructed to generate a reconstructed value. The co-located luma sample can be chosen from one or more candidate positions based on the position of the target chroma sample.

At step 1104, the reconstructed value associated with the co-located luma sample is used to obtain a first classification result. For example, the reconstructed value associated with the co-located luma sample can be classified using any classification method, such as BO, EO, etc. In some embodiments, the range of the reconstructed value associated with the co-located luma sample is divided into $N_L$ bands, and a band index of the reconstructed value associated with the co-located luma sample is determined. The value of $N_L$ is allowed to change from 1 to $N_{LMAX}$, and $N_{LMAX}$ is a positive integer. In some embodiments, the range of the reconstructed value associated with the co-located luma sample is divided equally.

At step 1106, a reconstructed value associated with the target chroma sample is used to obtain a second classification result. In some embodiments, the range of the reconstructed value associated with the target chroma sample (i.e., the output value of applying DBF to the target chroma sample) is divided into $N_C$ bands, and a band index of the reconstructed value associated with the target chroma sample is determined. The value of $N_C$ is allowed to change from 1 to $N_{CMAX}$, and $N_{CMAX}$ is a positive integer. In some embodiments, the range of the reconstructed value associated with the target chroma sample is divided equally.

At step 1108, the target chroma sample is classified based on the first classification result and the second classification result. In some embodiments, the total number of the categories of the target chroma sample is $N_L * N_C$. The category index of the target chroma sample is determined based on the band index of the reconstructed value associated with the co-located luma sample, the band index of the reconstructed value associated with the target chroma sample, and $N_L$, or $N_C$. In some embodiments, the value of $N_{LMAX}$ and $N_{CMAX}$ can be different. In some embodiments, the value of $N_{LMAX}$ is 16, and the value of $N_{CMAX}$ is 2. Both $N_L$ and $N_c$ are signaled in PH.

At step 1110, an offset is determined based on the classification result of the target chroma sample. For example, the offset is determined corresponding to the category index of the target chroma sample. For each category, one offset is signaled in PH.

At step 1112, the offset is added to a reconstructed value associated with the target chroma sample. That is, the offset is added to the reconstructed value associated with the target chroma sample (e.g., the output value of applying SAO or ESAO to the target chroma sample).

In some embodiments, the method 1100 can be performed according to the following equations:

$$\text{idx\_L} = (Y_{rec}^{dbf} * N_L) >> \text{bitdepth} \qquad \text{Eq. (5)}$$

$$\text{idx\_C} = (C_{rec}^{dbf} * N_C) >> \text{bitdepth} \qquad \text{Eq. (6)}$$

$$\text{idx} = \text{idx\_L} * N_C + \text{idx\_C} \qquad \text{Eq. (7)}$$

$$C_{rec}' = C_{rec} + \text{offset[idx]} \qquad \text{Eq. (8)}$$

where, $Y_{rec}^{dbf}$ is the reconstructed value associated with the selected co-located luma sample after DBF, $C_{rec}^{dbf}$ is the reconstructed value associated with the target chroma sample after DBF, bitdepth is the internal coding bit depth, idx_L is the band index of the $Y_{rec}^{dbf}$, idx_C is the band index of the $C_{rec}^{dbf}$, idx is the category index of the target chroma sample, offset[idx] is the offset, $C_{rec}$ is the reconstructed value associated with the target chroma sample after SAO or ESAO, and $C_{rec}'$ is a reconstructed value associated with the target chroma sample after CCSAO.

In another example, the information of chroma and information of luma can be swapped. That is, Equation (7) can be modified as follows:

$$\text{idx} = \text{idx\_C} * N_L + \text{idx\_L} \qquad \text{Eq. (9)}$$

With this method, both luma information and chroma information are considered for CCSAO classification. Therefore, the classification for a current sample is more accurate.

In some exemplary embodiments, the proposed classification method can be combined with the above-described CCSAO-QUA. Specifically, a frame can be divided into up to 4 regions (FIG. 9A) or 16 regions (FIG. 9B). For each region, the above-described classification method 1100 can be used and the CCSAO parameters for each region can be different. Therefore, the classification for a frame is more accurate.

In some exemplary embodiments, the proposed classification method can be combined with the above-described CCSAO method with multiple classifiers.

For the second aspect, according to some exemplary embodiments, different classification methods are used for CCSAO.

In some exemplary embodiments, a non-uniform BO classification method is used.

Generally, there are more samples falling into a same category that is around the mean value or median value or mode value of all the reconstructed value associated with the co-located luma sample if dividing the range of the reconstructed value associated with the co-located luma sample equally. In some embodiments, the non-uniform BO classification method is based on different intervals of bands. For example, the range of the reconstructed value of co-located luma sample is not equally divided into $N_L$ bands, and smaller intervals are used around the mean value or median value or mode value of all the reconstructed values associated with the co-located luma samples. Therefore, the number of samples in each category can be balanced to void the numbers of samples in different categories varying greatly, such that the video processing efficiency and accuracy are improved. It can be understood that the non-uniform BO classification method can also be used for classifying the reconstructed chroma sample.

In some embodiments, the non-uniform BO classification method is based on the number of samples in one category. For example, the range of the reconstructed value associated with the co-located luma sample is divided into $N_L$ bands and the number of the chroma samples in each category is the same. In some embodiments, the range of the reconstructed value associated with the chroma sample is divided in to $N_C$ bands and the number of the co-located reconstructed luma sample in each category is the same. With the same number of samples in each category, the efficiency of the video processing can be improved.

In some exemplary embodiments, the EO classification method is used for CCSAO.

In some embodiments, the above-described EO method in SAO (e.g., referring to Table 1 and FIG. 5) is used for CCSAO. For example, for each selected co-located luma sample, the classification result can be obtained by compared the selected co-located luma sample with two neighboring luma samples according to the rules in Table 1.

In some embodiments, the above-described EO methods in ESAO (e.g., referring to Table 2 and FIG. 6) are used for CCSAO. For example, for each selected co-located luma sample, the classification result can be obtained by compared the selected co-located luma sample with 8 surrounding luma samples according to the methods in Table 2. One or both of the two methods in Table 2 can be used.

It can be understood that, the above-described EO methods in SAO or in ESAO can also be used for classifying the reconstructed chroma sample.

In some exemplary embodiments, both BO and EO classification methods can be used for CCSAO.

Figure 12:
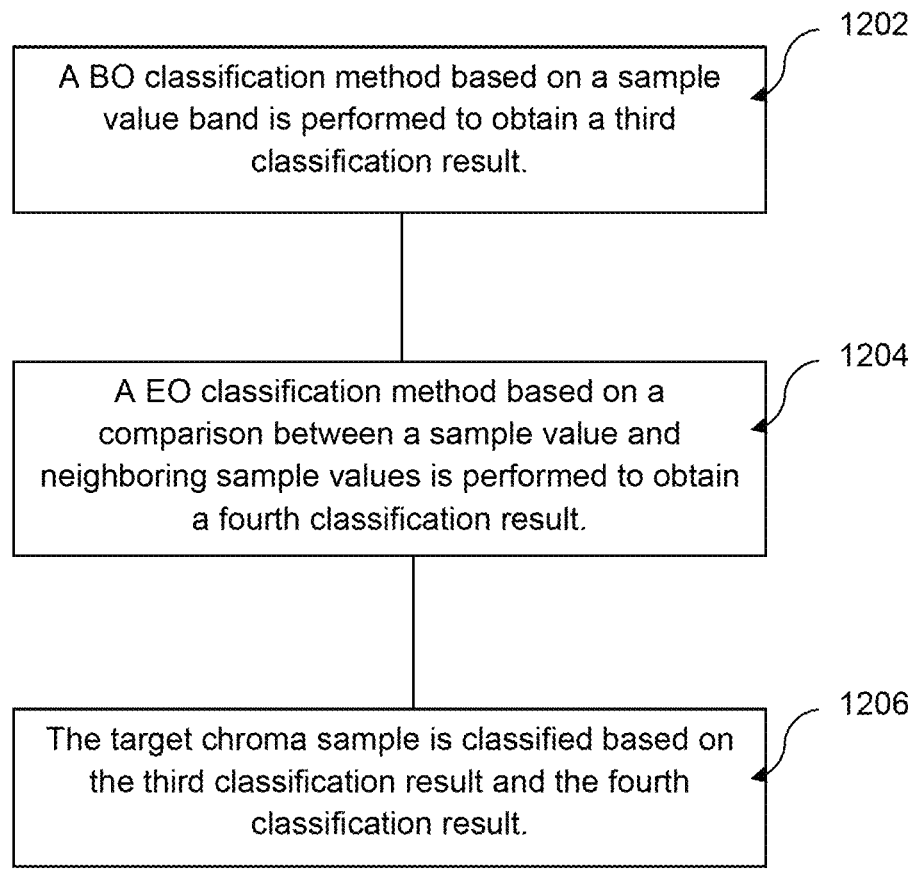
FIG. 12 illustrates a flow chart of a method for CCSAO classification using both BO and EO classification methods, according to some embodiments of the present disclosure.

FIG. 12 illustrates a flow chart of a method 1200 for CCSAO classification using both BO and EO classification methods, according to some embodiments of the present disclosure. Method 1200 can be performed by an encoder (e.g., by process 200A of FIG. 2A or 200B of FIG. 2B), a decoder (e.g., by process 300A of FIG. 3A or 300B of FIG. 3B) or performed by one or more software or hardware components of an apparatus (e.g., apparatus 400 of FIG. 4). For example, a processor (e.g., processor 402 of FIG. 4) can perform method 1200. In some embodiments, method 1200 can be implemented by a computer program product, embodied in a computer-readable medium, including computer-executable instructions, such as program code, executed by computers (e.g., apparatus 400 of FIG. 4). Referring to FIG. 12, method 1200 may include the following steps 1202-1206.

At step 1202, a BO classification method based on a sample value band is performed to obtain a third classification result. The BO method can be the uniform band offset method or the non-uniform band offset method. For example, the uniform BO method is performed on the reconstructed value associated with the target chroma sample, then, the target chroma sample is classified to a BO category based on a band index of the reconstructed value associated with the target chroma sample.

At step 1204, the EO classification method based on a comparison between a sample value and neighboring sample values is performed to obtain a fourth classification result. The EO method can be the EO method in SAO or ESAO (e.g., referring to Table 1 or Table 2). For example, the EO method in SAO is performed on a co-located luma sample. After that, the target chroma sample is classified to an EO category based on the reconstructed value associated with the co-located luma sample and a reconstructed value associated with the neighboring luma sample of the co-located luma sample.

At step 1206, the target chroma sample is classified based on the third classification result and the fourth classification result. Both the range and neighboring samples are considered for the classification. The classification of the sample is more accurate with the multiple classification methods performed. It is understood that the method 1200 can also be performed on reconstructed chroma sample.

In some exemplary embodiments, all the above-described classification methods (e.g., BO method, non-uniform BO method, EO methods in SAO or ESAO, etc.) can be combined for CCSAO. That is, both the co-located reconstructed luma samples and the reconstructed chroma samples output from the de-blocking filter (DBF) are used for the CCSAO classification and different BO or EO methods can be used for the co-located reconstructed luma sample and the reconstructed chroma sample, respectively.

For example, for co-located reconstructed luma sample, the EO method 1 of ESAO (referring to Table 2) is used; and for reconstructed chroma sample, the uniform BO method is used. The combinations of the classification methods used for co-located reconstructed luma sample and reconstructed chroma sample can be varied.

In some exemplary embodiments, the proposed classification methods can be combined with the above-described CCSAO-QUA. Specifically, a frame can be divided into up to 4 regions (FIG. 9A) or 16 regions (FIG. 9B). For each region, the classification method provided by the present disclosure can be used and the CCSAO parameters for each region can be different.

In some exemplary embodiments, the proposed classification methods can be combined with the above-described CCSAO method with multiple classifiers.

For the third aspect, according to some exemplary embodiments, different positions of the co-located luma samples are used.

In some exemplary embodiments, the candidate positions of the co-located luma samples are modified, not limited to 9 positions.

Figure 13:
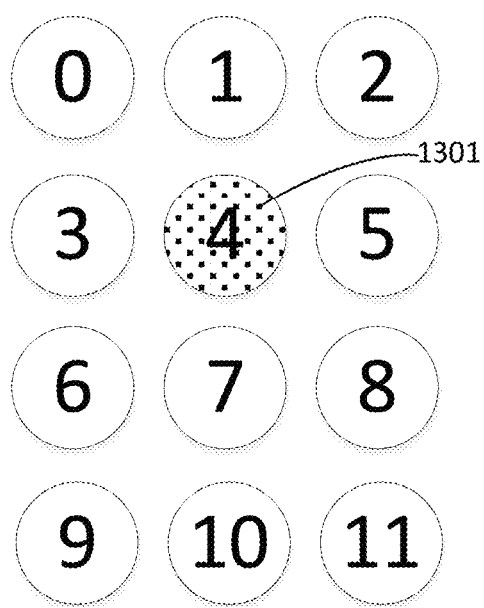
FIG. 13 illustrates twelve positions of co-located luma samples, according to some embodiments of the present disclosure.

FIG. 13 illustrates 12 candidate positions of co-located luma samples, according to some embodiments of the present disclosure. As shown in FIG. 13, in a picture, the top-left sample of a picture is at (0, 0). If the current chroma sample is at (i, j), the selected co-located luma sample is at (2i, 2j) 1301 (i.e., the circle with index of 4).

Figure 14:
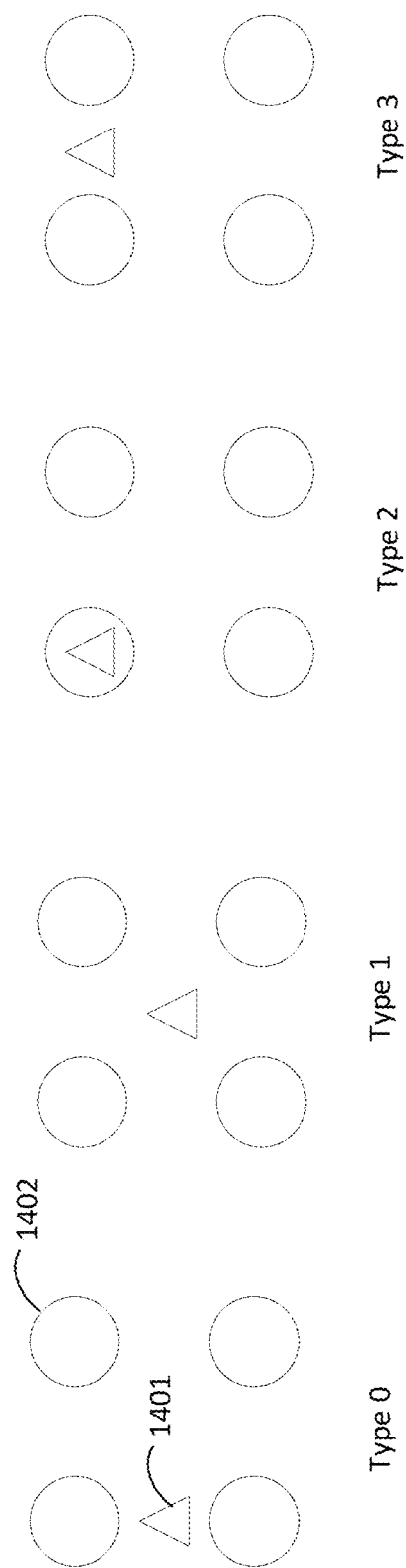
FIG. 14 illustrates four types of 4:2:0 format videos, according to some embodiments of the present disclosure.
Figure 15:
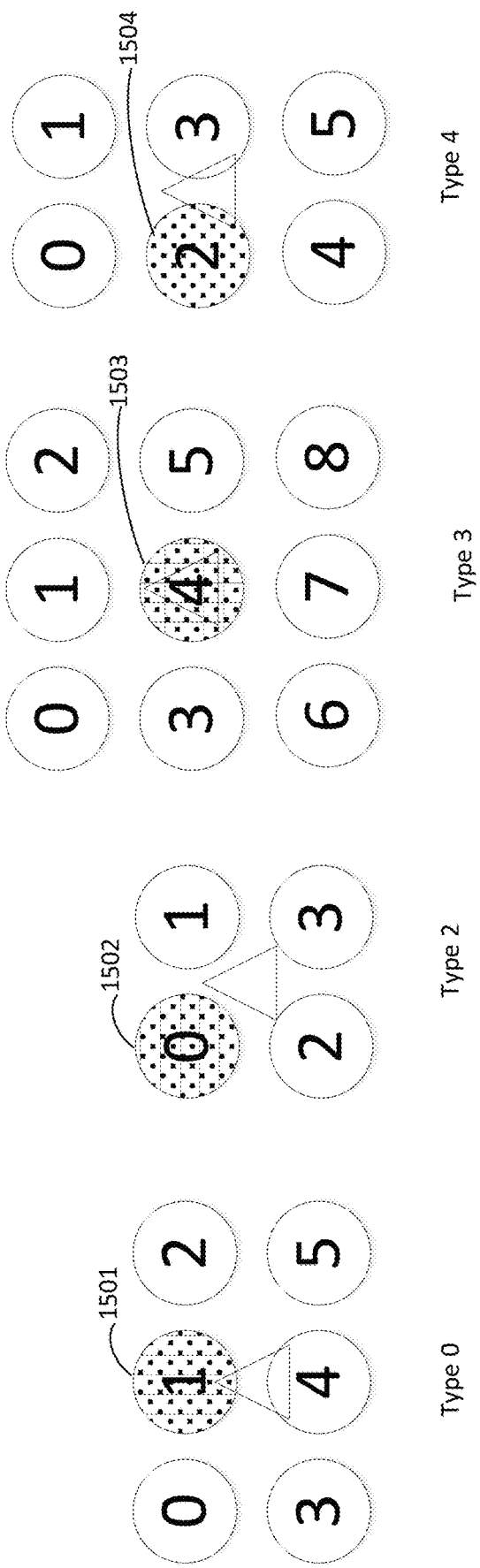
FIG. 15 illustrates different positions of co-located luma samples for different types of 4:2:0 format videos, according to some embodiments of the present disclosure.

In some exemplary embodiments, different positions of the co-located luma samples are determined based on different types of a picture including the chroma sample. FIG. 14 illustrates four types of 4:2:0 format videos, according to some embodiments of the present disclosure. As shown in FIG. 14, for a 4:2:0 format video, there are four types (type 0 to type 3) with different chroma sample down-sampled methods and different relationship between luma and chroma sample positions, where the triangles (e.g., 1401) illustrate the chroma samples and the circles (e.g., 1402) illustrate the luma samples. FIG. 15 illustrates different positions of co-located luma samples selected for different types of 4:2:0 format videos, according to some embodiments of the present disclosure. As shown in FIG. 15, 6, 4, 9, and 6 different positions are used for type 0, type 1, type 2 and type 3, respectively. For example, for type 0, co-located luma samples at 6 different positions are used, and the selected co-located luma sample (e.g., 1501) is shown as the circle in shadow with an index of 1. For type 1, co-located luma samples at 4 different positions are used, and the selected co-located luma sample (e.g., 1502) is shown as the circle in shadow with an index of 0. For type 2, co-located luma samples at 9 different positions are used, and the selected co-located luma sample (e.g., 1503) is shown as the circle in shadow with an index of 4. For type 3, co-located luma samples at 6 different positions are used, and the selected co-located luma sample (e.g., 1503) is shown as the circle in shadow with an index of 2. The positions of the co-located luma samples can be different according to different types. Using different positions for the four types of different relationship between luma and chroma sample positions, the co-located luma sample can be selected more accurately.

In some exemplary embodiments, different positions of the co-located luma samples are determined based on different video formats.

For example, for 4:4:4 YUV format videos, only one position of the co-located luma sample is used; for 4:2:0 and 4:2:2 YUV format videos, 9 positions of the co-located luma samples are used. Therefore, the positions for the co-located luma sample selection are more efficient.

Regarding the fourth problem described above, according to some exemplary embodiments, the first top row and the first left column of a frame are padded, so that CCSAO can be performed on the chroma samples of the first row and first column within a frame.

Figure 16:
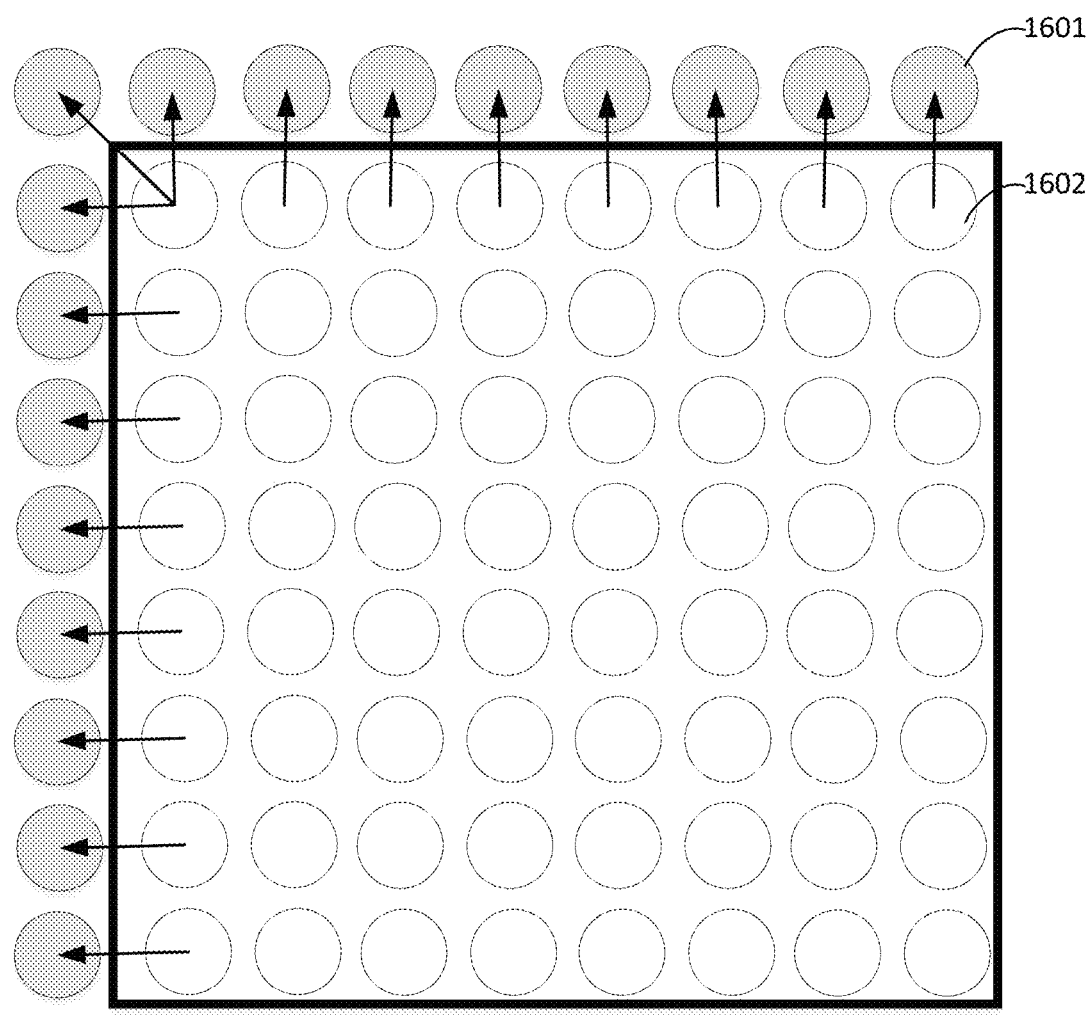
FIG. 16 illustrates a padding method using a most recent luma sample, according to some embodiments of the present disclosure.

FIG. 16 illustrates a padding method using a recent luma sample value, according to some embodiments of the present disclosure. As shown in FIG. 16, for each position that needs to be padded (e.g., 1601), the most recent luma sample (e.g., 1602) value is used for padding. Therefore, for the first row and the first column of a frame, if the position in the 9 positions of the co-located luma sample does not exist, the missing position can be padded by the most recent luma sample, such that a full 9 positions can be obtained for CCSAO. Therefore, the performance of CCSAO is improved.

In some embodiments, for each position that needs to be padded, a fixed value is used for padding. The value can be 1<<(bitdepth−1) or any other non-negative integer number.

The embodiments may further be described using the following clauses:

1. A video data processing method for cross-component sample adaptive offset, comprising:
   classifying a target chroma sample based on a first reconstructed value associated with a co-located luma sample and a second reconstructed value associated with the target chroma sample;
   determining an offset based on the classifying; and
   adding the offset to a third reconstructed value associated with the target chroma sample.

2. The method according to clause 1, wherein the classifying the target chroma sample further comprises:
   determining a first classification result of the target chroma sample based on the first reconstructed value;
   determining a second classification result of the target chroma sample based on the second reconstructed value; and
   classifying the target chroma sample based on the first classification result and the second classification result.

3. The method according to clause 2, wherein the determining the first classification result of the target chroma sample based on the first reconstructed value further comprises:
   dividing a range of the first reconstructed value into a first number of bands; and
   determining a band index of the first reconstructed value;
   the determining the second classification result of the target chroma sample based on the second reconstructed value further comprises:
   dividing a range of the second reconstructed value into a second number of bands; and
   determining a band index of the second reconstructed value; and
   the determining the offset based on the classifying further comprises:
   determining a category index of the target chroma sample based on the band index of the first reconstructed value, the band index of the second reconstructed value, and one of the first number and the second number; and
   determining the offset corresponding to the category index of the target chroma sample.

4. The method according to clause 3, wherein the band index of the first reconstructed value is obtained by:

$$\mathrm{idx\_}L = (Y_{rec}^{dbf} * N_L) >> \mathrm{bitdepth},$$

the band index of the second reconstructed value is obtained by:

$$\mathrm{idx\_}C = (C_{rec}^{dbf} * N_C) >> \mathrm{bitdepth}, \text{ and}$$

the category index of the target chroma sample is obtained by:

$$\mathrm{idx} = \mathrm{idx\_}L * N_C + \mathrm{idx\_}C \text{ or } \mathrm{idx} = \mathrm{idx\_}C * N_L + \mathrm{idx\_}L;$$

wherein, the $Y_{rec}^{dbf}$ is the first reconstructed value, the $C_{rec}^{dbf}$ is the second reconstructed value, the bitdepth is an internal coding bit depth, the $N_L$ is the first number, the $N_C$ is the second number, the idx_L is the band index of the first reconstructed value, the idx_C is the band index of the second reconstructed value, and the idx is the category index of the target chroma sample.

5. The method according to clause 4, wherein the $N_L$ has a range from 1 to $N_{LMAX}$, the $N_C$ has a range from 1 to $N_{CMAX}$, and $N_{LMAX}$ and $N_{CMAX}$ are positive integers.

6. The method according to clause 5, wherein the $N_{LMAX}$ and $N_{CMAX}$ are different.

7. The method according to clause 6, wherein the $N_{LMAX}$ is 16 and the $N_{CMAX}$ is 2.

8. The method according to any one of clauses 1 to 7, wherein the classifying the target chroma sample further comprises:
   determining a third classification result of the target chroma sample based on the second reconstructed value;
   determining a fourth classification result of the target chroma sample based on the first reconstructed value and a fourth reconstructed value associated with a neighboring luma sample of the co-located luma sample; and
   classifying the target chroma sample based on the third classification result and the fourth classification result.

9. The method according to any one of clauses 1 to 8, wherein the co-located luma sample is selected from one or more co-located luma samples at different positions.

10. The method according to clause 9, wherein the one or more co-located luma samples are determined based on a video format.

11. The method according to any one of clauses 1 to 10, further comprising:
   padding a first top row and a first left column of a picture including the target chroma sample, wherein the padding uses a most recent luma sample value or a fixed value.

12. An apparatus for performing video data processing, the apparatus comprising:
   a memory figured to store instructions; and
   one or more processors configured to execute the instructions to cause the apparatus to perform:
      classifying a target chroma sample based on a first reconstructed value associated with a co-located luma sample and a second reconstructed value associated with the target chroma sample;
      determining an offset based on the classifying; and
      adding the offset to a third reconstructed value associated with the target chroma sample.

13. The apparatus according to clause 12, wherein the processor is further configured to execute the instructions to cause the apparatus to perform:
   determining a first classification result of the target chroma sample based on the first reconstructed value;
   determining a second classification result of the target chroma sample based on the second reconstructed value; and
   classifying the target chroma sample based on the first classification result and the second classification result.

14. The apparatus according to clause 13, wherein the processor is further configured to execute the instructions to cause the apparatus to perform:
   dividing a range of the first reconstructed value into a first number of bands;
   determining a band index of the first reconstructed value;
   dividing a range of the second reconstructed value into a second number of bands;
   determining a band index of the second reconstructed value;
   determining a category index of the target chroma sample based on the band index of the first reconstructed value, the band index of the second reconstructed value, and one of the first number and the second number; and
   determining the offset corresponding to the category index of the target chroma sample.

15. The apparatus according to clause 14, wherein the band index of the first reconstructed value is obtained by:

$$\mathrm{idx\_L} = (Y_{rec}^{dbf} * N_L) \gg \mathrm{bitdepth},$$

the band index of the second reconstructed value is obtained by:

$$\mathrm{idx\_C} = (C_{rec}^{dbf} * N_C) \gg \mathrm{bitdepth}, \text{ and}$$

the category index of the target chroma sample is obtained by:

$$\mathrm{idx} = \mathrm{idx\_L} * N_C + \mathrm{idx\_C} \text{ or } \mathrm{idx} = \mathrm{idx\_C} * N_L + \mathrm{idx\_L};$$

wherein, the $Y_{rec}^{dbf}$ is the first reconstructed value, the $C_{rec}^{dbf}$ is the second reconstructed value, the bitdepth is an internal coding bit depth, the $N_L$ is the first number, the $N_C$ is the second number, the idx_L is the band index of the first reconstructed value, the idx_C is the band index of the second reconstructed value, and the idx is the category index of the target chroma sample.

16. The apparatus according to clause 15, wherein the $N_L$ has a range from 1 to $N_{LMAX}$, the $N_C$ has a range from 1 to $N_{CMAX}$, and $N_{LMAX}$ and $N_{CMAX}$ are positive integers.

17. The apparatus according to clause 16, wherein the $N_{LMAX}$ and $N_{CMAX}$ are different.

18. The apparatus according to clause 17, wherein the $N_{LMAX}$ is 16 and the $N_{CMAX}$ is 2.

19. The apparatus according to any one of clauses 12 to 18, wherein the processor is further configured to execute the instructions to cause the apparatus to perform:
   determining a third classification result of the target chroma sample based on the second reconstructed value;
   determining a fourth classification result of the target chroma sample based on the first reconstructed value and a fourth reconstructed value associated with a neighboring luma sample of the co-located luma sample; and
   classifying the target chroma sample based on the third classification result and the fourth classification result.

20. The apparatus according to any one of clauses 12 to 19, wherein the co-located luma sample is selected from one or more co-located luma samples at different positions.

21. The apparatus according to clause 20, wherein the one or more co-located luma samples are determined based on a video format.

22. The apparatus according to any one of clauses 12 to 21, wherein the processor is further configured to execute the instructions to cause the apparatus to perform:
   padding a first top row and a first left column of a picture including the target chroma sample, wherein the padding uses a most recent luma sample value or a fixed value.

23. A non-transitory computer readable medium that stores a set of instructions that is executable by one or more processors of an apparatus to cause the apparatus to initiate a method for performing video data processing, the method comprising:
   classifying a target chroma sample based on a first reconstructed value associated with a co-located luma sample and a second reconstructed value associated with the target chroma sample;
   determining an offset based on the classifying; and
   adding the offset to a third reconstructed value associated with the target chroma sample.

24. The non-transitory computer readable medium of clause 23, wherein the set of instructions that is executable by one or more processors of an apparatus to cause the apparatus to further perform:

determining a first classification result of the target chroma sample based on the first reconstructed value;

determining a second classification result of the target chroma sample based on the second reconstructed value; and classifying the target chroma sample based on the first classification result and the second classification result.

25. The non-transitory computer readable medium of clause 24, wherein the set of instructions that is executable by one or more processors of an apparatus to cause the apparatus to further perform:

dividing a range of the first reconstructed value into a first number of bands; and determining a band index of the first reconstructed value;

dividing a range of the second reconstructed value into a second number of bands;

determining a band index of the second reconstructed value;

determining a category index of the target chroma sample based on the band index of the first reconstructed value, the band index of the second reconstructed value, and one of the first number and the second number; and determining the offset corresponding to the category index of the target chroma sample.

26. The non-transitory computer readable medium of clause 25, wherein the band index of the first reconstructed value is obtained by:

$$idx\_L=(Y_{rec}^{dbf}*N_L)>>bitdepth,$$

the band index of the second reconstructed value is obtained by:

$$idx\_C=(C_{rec}^{dbf}*N_C)>>bitdepth, \text{ and}$$

the category index of the target chroma sample is obtained by:

$$idx=idx\_L*N_C+idx\_C \text{ or } idx=idx\_C*N_L+idx\_L;$$

wherein, the $Y_{rec}^{dbf}$ is the first reconstructed value, the $C_{rec}^{dbf}$ is the second reconstructed value, the bitdepth is an internal coding bit depth, the $N_L$ is the first number, the $N_C$ is the second number, the idx_L is the band index of the first reconstructed value, the idx_C is the band index of the second reconstructed value, and the idx is the category index of the target chroma sample.

27. The non-transitory computer readable medium according to clause 26, wherein the $N_L$ has a range from 1 to $N_{LMAX}$, the $N_C$ has a range from 1 to $N_{CMAX}$, and $N_{LMAX}$ and $N_{CMAX}$ are positive integers.

28. The non-transitory computer readable medium according to clause 27, wherein the $N_{LMAX}$ and $N_{CMAX}$ are different.

29. The non-transitory computer readable medium according to clause 28, wherein the $N_{LMAX}$ is 16 and the $N_{CMAX}$ is 2.

30. The non-transitory computer readable medium according to any one of clauses 23 to 29, wherein the set of instructions that is executable by one or more processors of an apparatus to cause the apparatus to further perform:

determining a third classification result of the target chroma sample based on the second reconstructed value;

determining a fourth classification result of the target chroma sample based on the first reconstructed value and a fourth reconstructed value associated with a neighboring luma sample of the co-located luma sample; and classifying the target chroma sample based on the third classification result and the fourth classification result.

31. The non-transitory computer readable medium according to any one of clauses 23 to 30, wherein the co-located luma sample is selected from one or more co-located luma samples at different positions.

32. The non-transitory computer readable medium according to clause 31, wherein the one or more co-located luma samples are determined based on a video format.

33. The non-transitory computer readable medium to any one of clauses 23 to 32, wherein the set of instructions that is executable by one or more processors of an apparatus to cause the apparatus to further perform:

padding a first top row and a first left column of a picture including the target chroma sample, wherein the padding uses a most recent luma sample value or a fixed value.

34. A video data processing method for cross-component sample adaptive offset, comprising:

receiving a bitstream;

determining a category index of a target chroma sample, wherein the category index is determined based on a first reconstructed value associated with a co-located luma sample and a second reconstructed value associated with the target chroma sample;

decoding an index indicating an offset corresponding to the category index from the bitstream;

determining the offset based on the index; and adding the offset to a third reconstructed value associated with the target chroma sample.

35. The method according to clause 34, wherein determining the category index of the target chroma sample further comprises:

determining a first classification result of the target chroma sample based on the first reconstructed value;

determining a second classification result of the target chroma sample based on the second reconstructed value; and determining the category index of a target chroma sample based on the first classification result and the second classification result.

36. The method according to clause 35, wherein the determining the first classification result of the target chroma sample based on the first reconstructed value further comprises:

decoding a first number of bands from the bitstream;

dividing a range of the first reconstructed value into the first number of bands; and determining a band index of the first reconstructed value;

the determining the second classification result of the target chroma sample based on the second reconstructed value further comprises:

decoding a second number of bands from the bitstream dividing a range of the second reconstructed value into the second number of bands; and determining a band index of the second reconstructed value; and determining the category index of the target chroma sample further comprises:

determining the category index of the target chroma sample based on the band index of the first reconstructed value, the band index of the second reconstructed value, and one of the first number and the second number.

37. The method according to clause 36, wherein the band index of the first reconstructed value is obtained by:

$$idx\_L=(Y_{rec}^{dbf}*N_L)>>bitdepth,$$

the band index of the second reconstructed value is obtained by:

$$idx\_C=(C_{rec}^{dbf}*N_C)>>bitdepth, and$$

the category index of the target chroma sample is obtained by:

$$idx=idx\_L*N_C+idx\_C \text{ or } idx=idx\_C*N_L+idx\_L;$$

wherein, the $Y_{rec}^{dbf}$ is the first reconstructed value, the $C_{rec}^{dbf}$ is the second reconstructed value, the bitdepth is an internal coding bit depth, the $N_L$ is the first number, the $N_C$ is the second number, the idx_L is the band index of the first reconstructed value, the idx_C is the band index of the second reconstructed value, and the idx is the category index of the target chroma sample.

38. The method according to clause 37, wherein the $N_L$ has a range from 1 to $N_{LMAX}$, the $N_C$ has a range from 1 to Now, and $N_{LMAX}$ and Now are positive integers.

39. The method according to clause 38, wherein the $N_{LMAX}$ and $N_{CMAX}$ are different.

40. The method according to clause 39, wherein the $N_{LMAX}$ is 16 and the Now is 2.

41. The method according to any one of clauses 34 to 40, wherein the determining the category index of the target chroma sample further comprises:
determining a third classification result of the target chroma sample based on the second reconstructed value;
determining a fourth classification result of the target chroma sample based on the first reconstructed value and a fourth reconstructed value associated with a neighboring luma sample of the co-located luma sample; and
determining the category index of a target chroma sample based on the third classification result and the fourth classification result.

42. The method according to any one of clause 34 to 41, wherein the co-located luma sample is selected from one or more co-located luma samples at different positions.

43. The method according to clause 42, wherein the one or more co-located luma samples are determined based on a video format.

44. The method according to any one of clauses 34 to 43, further comprising:
padding a first top row and a first left column of a picture including the target chroma sample, wherein the padding uses a most recent luma sample value or a fixed value.

45. An apparatus for performing video data processing, the apparatus comprising:
a memory figured to store instructions; and
one or more processors configured to execute the instructions to cause the apparatus to perform:
receiving a bitstream;
determining a category index of a target chroma sample, wherein the category index is determined based on a first reconstructed value associated with a co-located luma sample and a second reconstructed value associated with the target chroma sample;
decoding an index indicating an offset corresponding to the category index from the bitstream;
determining the offset based on the index; and
adding the offset to a third reconstructed value associated with the target chroma sample.

46. The apparatus according to clause 45, wherein in the determining the category index of a target chroma sample, the processor is further configured to execute the instructions to cause the apparatus to perform:
determining a first classification result of the target chroma sample based on the first reconstructed value;
determining a second classification result of the target chroma sample based on the second reconstructed value; and
determining the category index of a target chroma sample based on the first classification result and the second classification result.

47. The apparatus according to clause 46, wherein in the determining the first classification result of the target chroma sample based on the first reconstructed value, the processor is further configured to execute the instructions to cause the apparatus to perform:
decoding a first number of bands from the bitstream;
dividing a range of the first reconstructed value into the first number of bands; and
determining a band index of the first reconstructed value;
in the determining the second classification result of the target chroma sample based on the second reconstructed value, the processor is further configured to execute the instructions to cause the apparatus to perform:
decoding a second number of bands from the bitstream
dividing a range of the second reconstructed value into the second number of bands; and
determining a band index of the second reconstructed value; and
in the determining the category index of the target chroma sample, the processor is further configured to execute the instructions to cause the apparatus to perform:
determining the category index of the target chroma sample based on the band index of the first reconstructed value, the band index of the second reconstructed value, and one of the first number and the second number.

48. The apparatus according to clause 47, wherein the band index of the first reconstructed value is obtained by:

$$idx\_L=(Y_{rec}^{dbf}*N_L)>>bitdepth,$$

the band index of the second reconstructed value is obtained by:

$$idx\_C=(C_{rec}^{dbf}*N_C)>>bitdepth, and$$

the category index of the target chroma sample is obtained by:

$$idx=idx\_L*N_C+idx\_C \text{ or } idx=idx\_C*N_L+idx\_L;$$

wherein, the $Y_{rec}^{dbf}$ is the first reconstructed value, the $C_{rec}^{dbf}$ is the second reconstructed value, the bitdepth is an internal coding bit depth, the $N_L$ is the first number, the $N_C$ is the second number, the idx_L is the band index of the first reconstructed value, the idx_C is the band index of the second reconstructed value, and the idx is the category index of the target chroma sample.

49. The apparatus according to clause 48, wherein the $N_L$ has a range from 1 to $N_{LMAX}$, the $N_C$ has a range from 1 to Now, and $N_{LMAX}$ and Now are positive integers.

50. The apparatus according to clause 49, wherein the $N_{LMAX}$ and $N_{CMAX}$ are different.

51. The apparatus according to clause 50, wherein the $N_{LMAX}$ is 16 and the $N_{CMAX}$ is 2.

52. The apparatus according to any one of clauses 45 to 51, wherein in the determining the category index of the target chroma sample, the processor is further configured to execute the instructions to cause the apparatus to perform:
determining a third classification result of the target chroma sample based on the second reconstructed value;
determining a fourth classification result of the target chroma sample based on the first reconstructed value and a fourth reconstructed value associated with a neighboring luma sample of the co-located luma sample; and determining the category index of the target chroma sample based on the third classification result and the fourth classification result.

53. The apparatus according to any one of clauses 45 to 52, wherein the co-located luma sample is selected from one or more co-located luma samples at different positions.

54. The apparatus according to clause 53, wherein the one or more co-located luma samples are determined based on a video format.

55. The apparatus according to any one of clauses 45 to 54, wherein the processor is further configured to execute the instructions to cause the apparatus to perform:

padding a first top row and a first left column of a picture including the target chroma sample, wherein the padding uses a most recent luma sample value or a fixed value.

56. A non-transitory computer readable medium that stores a set of instructions that is executable by one or more processors of an apparatus to cause the apparatus to initiate a method for performing video data processing, the method comprising:

receiving a bitstream;

determining a category index of a target chroma sample, wherein the category index is determined based on a first reconstructed value associated with a co-located luma sample and a second reconstructed value associated with the target chroma sample;

decoding an index indicating an offset corresponding to the category index from the bitstream;

determining the offset based on the index; and adding the offset to a third reconstructed value associated with the target chroma sample.

57. The non-transitory computer readable medium of clause 56, wherein in the determining the category index of a target chroma sample, the set of instructions that is executable by one or more processors of an apparatus to cause the apparatus to further perform:

determining a first classification result of the target chroma sample based on the first reconstructed value;

determining a second classification result of the target chroma sample based on the second reconstructed value; and determining the category index of a target chroma sample based on the first classification result and the second classification result.

58. The non-transitory computer readable medium of clause 57, wherein in the determining the first classification result of the target chroma sample based on the first reconstructed value, the set of instructions that is executable by one or more processors of an apparatus to cause the apparatus to further perform:

decoding a first number of bands from the bitstream;

dividing a range of the first reconstructed value into the first number of bands; and determining a band index of the first reconstructed value;

in the determining the second classification result of the target chroma sample based on the second reconstructed value, the set of instructions that is executable by one or more processors of an apparatus to cause the apparatus to further perform:

decoding a second number of bands from the bitstream dividing a range of the second reconstructed value into the second number of bands; and determining a band index of the second reconstructed value; and in the determining the category index of the target chroma sample, the set of instructions that is executable by one or more processors of an apparatus to cause the apparatus to further perform:

determining the category index of the target chroma sample based on the band index of the first reconstructed value, the band index of the second reconstructed value, and one of the first number and the second number.

59. The non-transitory computer readable medium of clause 58, wherein the band index of the first reconstructed value is obtained by:

$$\mathrm{idx\_}L = (Y_{rec}^{dbf} * N_L) >> \mathrm{bitdepth},$$

the band index of the second reconstructed value is obtained by:

$$\mathrm{idx\_}C = (C_{rec}^{dbf} * N_C) >> \mathrm{bitdepth, and}$$

the category index of the target chroma sample is obtained by:

$$\mathrm{idx} = \mathrm{idx\_}L * N_C + \mathrm{idx\_}C \text{ or } \mathrm{idx} = \mathrm{idx\_}C * N_L + \mathrm{idx\_}L;$$

wherein, the $Y_{rec}^{dbf}$ is the first reconstructed value, the $C_{rec}^{dbf}$ is the second reconstructed value, the bitdepth is an internal coding bit depth, the $N_L$ is the first number, the $N_C$ is the second number, the idx_L is the band index of the first reconstructed value, the idx_C is the band index of the second reconstructed value, and the idx is the category index of the target chroma sample.

60. The non-transitory computer readable medium according to clause 59, wherein the $N_L$ has a range from 1 to $N_{LMAX}$, the $N_C$ has a range from 1 to $N_{CMAX}$, and $N_{LMAX}$ and $N_{CMAX}$ are positive integers.

61. The non-transitory computer readable medium according to clause 60, wherein the $N_{LMAX}$ and $N_{CMAX}$ are different.

62. The non-transitory computer readable medium according to clause 61, wherein the $N_{LMAX}$ is 16 and the $N_{CMAX}$ is 2.

63. The non-transitory computer readable medium according to any one of clauses 56 to 62, wherein in the determining the category index of the target chroma sample, the set of instructions that is executable by one or more processors of an apparatus to cause the apparatus to further perform:

determining a third classification result of the target chroma sample based on the second reconstructed value;

determining a fourth classification result of the target chroma sample based on the first reconstructed value and a fourth reconstructed value associated with a neighboring luma sample of the co-located luma sample; and determining the category index of the target chroma sample based on the third classification result and the fourth classification result.

64. The non-transitory computer readable medium according to any one of clauses 56 to 63, wherein the co-located luma sample is selected from one or more co-located luma samples at different positions.

65. The non-transitory computer readable medium according to clause 64, wherein the one or more co-located luma samples are determined based on a video format.

66. The non-transitory computer readable medium to any one of clauses 56 to 65, wherein the set of instructions that is executable by one or more processors of an apparatus to cause the apparatus to further perform:

padding a first top row and a first left column of a picture including the target chroma sample, wherein the padding uses a most recent luma sample value or a fixed value.

67. A non-transitory computer readable medium storing a data stream, wherein the data stream comprises an encoded index indicating an offset corresponding to a category index of a target chroma sample, wherein the category index is determined based on a first reconstructed value associated with a co-located luma sample and a second reconstructed value associated with the target chroma sample, and wherein the offset is used to adjust a third reconstructed value associated with the target chroma sample.

68. The non-transitory computer readable medium according to clause 67, wherein the category index of the target chroma sample is determined based on a first classification result and a second classification result, the first classification result being determined based on the first reconstructed value, the second classification result being determined based on the second reconstructed value.

69. The non-transitory computer readable medium according to clause 68, wherein the data stream comprises encoded syntax elements indicating a first number of bands and a second number of bands, wherein the first number of bands is used to divide a range of the first reconstructed value and determine a band index of the first reconstructed value, wherein the second number of bands is used to divide a range of the second reconstructed value and determine a band index of the second reconstructed value, and wherein the band index of the first reconstructed value, the band index of the second reconstructed value, and one of the first number and the second number are used to determine the category index of the target chroma sample.

70. The non-transitory computer readable medium according to clause 69, wherein the band index of the first reconstructed value is obtained by:

$$\text{idx\_L} = (Y_{rec}^{dbf} * N_L) \gg \text{bitdepth},$$

the band index of the second reconstructed value is obtained by:

$$\text{idx\_C} = (C_{rec}^{dbf} * N_C) \gg \text{bitdepth, and}$$

the category index of the target chroma sample is obtained by:

$$\text{idx} = \text{idx\_L} * N_C + \text{idx\_C or idx} = \text{idx\_C} * N_L + \text{idx\_L};$$

wherein, the $Y_{rec}^{dbf}$ is the first reconstructed value, the $C_{rec}^{dbf}$ is the second reconstructed value, the bitdepth is an internal coding bit depth, the $N_L$ is the first number, the $N_C$ is the second number, the idx_L is the band index of the first reconstructed value, the idx_C is the band index of the second reconstructed value, and the idx is the category index of the target chroma sample.

In some embodiments, a non-transitory computer-readable storage medium including instructions is also provided, and the instructions may be executed by a device (such as the disclosed encoder and decoder), for performing the above-described methods. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM or any other flash memory, NVRAM, a cache, a register, any other memory chip or cartridge, and networked versions of the same. The device may include one or more processors (CPUs), an input/output interface, a network interface, and/or a memory.

It should be noted that, the relational terms herein such as "first" and "second" are used only to differentiate an entity or operation from another entity or operation, and do not require or imply any actual relationship or sequence between these entities or operations. Moreover, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items.

As used herein, unless specifically stated otherwise, the term "or" encompasses all possible combinations, except where infeasible. For example, if it is stated that a database may include A or B, then, unless specifically stated otherwise or infeasible, the database may include A, or B, or A and B. As a second example, if it is stated that a database may include A, B, or C, then, unless specifically stated otherwise or infeasible, the database may include A, or B, or C, or A and B, or A and C, or B and C, or A and B and C.

It is appreciated that the above described embodiments can be implemented by hardware, or software (program codes), or a combination of hardware and software. If implemented by software, it may be stored in the above-described computer-readable media. The software, when executed by the processor can perform the disclosed methods. The computing units and other functional units described in this disclosure can be implemented by hardware, or software, or a combination of hardware and software. One of ordinary skill in the art will also understand that multiple ones of the above described modules/units may be combined as one module/unit, and each of the above described modules/units may be further divided into a plurality of sub-modules/sub-units.

In the foregoing specification, embodiments have been described with reference to numerous specific details that can vary from implementation to implementation. Certain adaptations and modifications of the described embodiments can be made. Other embodiments can be apparent to those skilled in the art from consideration of the specification and practice of the invention disclosed herein. It is intended that the specification and examples be considered as exemplary only, with a true scope and spirit of the invention being indicated by the following claims. It is also intended that the sequence of steps shown in figures are only for illustrative purposes and are not intended to be limited to any particular sequence of steps. As such, those skilled in the art can appreciate that these steps can be performed in a different order while implementing the same method.

In the drawings and specification, there have been disclosed exemplary embodiments. However, many variations and modifications can be made to these embodiments. Accordingly, although specific terms are employed, they are used in a generic and descriptive sense only and not for purposes of limitation.

What is claimed is:

1. A method of decoding a bitstream to output one or more pictures for a video stream with cross-component sample adaptive offset, the method comprising:

decoding a bitstream comprising coded information for one or more pictures, wherein the decoding comprises:

determining a category index of a target chroma sample, wherein the category index is determined based on a first reconstructed value associated with a co-located luma sample and a second reconstructed value associated with the target chroma sample;

decoding an index indicating an offset corresponding to the category index from the bitstream;

determining the offset based on the index; and adding the offset to a third reconstructed value associated with the target chroma sample.

2. The method according to claim 1, wherein the determining the category index of the target chroma sample further comprises:

determining a first classification result of the target chroma sample based on the first reconstructed value;

determining a second classification result of the target chroma sample based on the second reconstructed value; and determining the category index of a target chroma sample based on the first classification result and the second classification result.

3. The method according to claim 2, wherein the determining the first classification result of the target chroma sample based on the first reconstructed value further comprises:

decoding a first number of bands from the bitstream;

dividing a range of the first reconstructed value into the first number of bands; and determining a band index of the first reconstructed value;

the determining the second classification result of the target chroma sample based on the second reconstructed value further comprises:

decoding a second number of bands from the bitstream dividing a range of the second reconstructed value into the second number of bands; and determining a band index of the second reconstructed value; and determining the category index of the target chroma sample further comprises:

determining the category index of the target chroma sample based on the band index of the first reconstructed value, the band index of the second reconstructed value, and one of the first number and the second number.

4. The method according to claim 3, wherein the band index of the first reconstructed value is obtained by:

$$idx\_L=(Y_{rec}^{dbf}*N_L)>>bitdepth,$$

the band index of the second reconstructed value is obtained by:

$$idx\_C=(C_{rec}^{dbf}*N_C)>>bitdepth, and$$

the category index of the target chroma sample is obtained by:

$$idx=idx\_L*N_C+idx\_C \text{ or } idx=idx\_C*N_L+idx\_L;$$

wherein, the $Y_{rec}^{dbf}$ is the first reconstructed value, the $C_{rec}^{dbf}$ is the second reconstructed value, the bitdepth is an internal coding bit depth, the $N_L$ is the first number, the $N_C$ is the second number, the idx_L is the band index of the first reconstructed value, the idx_C is the band index of the second reconstructed value, and the idx is the category index of the target chroma sample.

5. The method according to claim 4, wherein the $N_L$ has a range from 1 to $N_{LMAX}$, the $N_C$ has a range from 1 to $N_{CMAX}$, and $N_{LMAX}$ and $N_{CMAX}$ are positive integers.

6. The method according to claim 5, wherein the $N_{LMAX}$ and $N_{CMAX}$ are different.

7. The method according to claim 6, wherein the $N_{LMAX}$ is 16 and the $N_{CMAX}$ is 2.

8. The method according to claim 1, wherein the determining the category index of the target chroma sample further comprises:

determining a third classification result of the target chroma sample based on the second reconstructed value;

determining a fourth classification result of the target chroma sample based on the first reconstructed value and a fourth reconstructed value associated with a neighboring luma sample of the co-located luma sample; and determining the category index of the target chroma sample based on the third classification result and the fourth classification result.

9. The method according to claim 1, wherein the co-located luma sample is selected from one or more co-located luma samples at different positions.

10. The method according to claim 9, wherein the one or more co-located luma samples are determined based on a video format.

11. The method according to claim 1, further comprising:

padding a first top row and a first left column of a picture including the target chroma sample, wherein the padding uses a most recent luma sample value or a fixed value.

12. The method according to claim 1, wherein a band offset (BO) method and an edge offset (EO) method are applied on the co-located luma sample and the target chroma sample.

13. A non-transitory computer readable medium storing a bitstream associated with a video sequence, wherein the bitstream comprises an encoded index indicating an offset corresponding to a category index of a target chroma sample, wherein the category index is determined based on a first reconstructed value associated with a co-located luma sample and a second reconstructed value associated with the target chroma sample, and wherein the offset is used to adjust a third reconstructed value associated with the target chroma sample.

14. The non-transitory computer readable medium according to claim 13, wherein the category index of the target chroma sample is determined based on a first classification result and a second classification result, wherein the first classification result being determined based on the first reconstructed value, and the second classification result being determined based on the second reconstructed value.

15. The non-transitory computer readable medium according to claim 14, wherein the bitstream comprises encoded syntax elements indicating a first number of bands and a second number of bands, wherein the first number of bands is used to divide a range of the first reconstructed value and determine a band index of the first reconstructed value, wherein the second number of bands is used to divide a range of the second reconstructed value and determine a band index of the second reconstructed value, and wherein the band index of the first reconstructed value, the band index of the second reconstructed value, and one of the first number and the second number are used to determine the category index of the target chroma sample.

16. The non-transitory computer readable medium according to claim 15, wherein the band index of the first reconstructed value is obtained by:

$$idx\_L=(Y_{rec}^{dbf}*N_L)\text{>>bitdepth},$$

the band index of the second reconstructed value is obtained by:

$$idx\_C=(C_{rec}^{dbf}*N_C)\text{>>bitdepth, and}$$

the category index of the target chroma sample is obtained by:

$$idx=idx\_L*N_C+idx\_C \text{ or } idx=idx\_C*N_L+idx\_L;$$

wherein, the $Y_{rec}^{dbf}$ is the first reconstructed value, the $C_{rec}^{dbf}$ is the second reconstructed value, the bitdepth is an internal coding bit depth, the $N_L$ is the first number, the $N_C$ is the second number, the idx_L is the band index of the first reconstructed value, the idx_C is the band index of the second reconstructed value, and the idx is the category index of the target chroma sample.

17. The non-transitory computer readable medium according to claim 13, wherein a band offset (BO) method and an edge offset (EO) method are applied on the co-located luma sample and the target chroma sample.

18. A method of encoding a video sequence into a bitstream with cross-component sample adaptive offset, the method comprising:
   receiving a video sequence;
   encoding one or more pictures of the video sequence; and
   generating a bitstream,
   wherein the encoding comprises:
      classifying a target chroma sample based on a first reconstructed value associated with a co-located luma sample and a second reconstructed value associated with the target chroma sample;
      determining an offset based on the classifying; and
      adding the offset to a third reconstructed value associated with the target chroma sample.

19. The method according to claim 18, wherein the classifying the target chroma sample further comprises:
   determining a first classification result of the target chroma sample based on the first reconstructed value;
   determining a second classification result of the target chroma sample based on the second reconstructed value; and
   classifying the target chroma sample based on the first classification result and the second classification result.

20. The method according to claim 19, wherein the determining the first classification result of the target chroma sample based on the first reconstructed value further comprises:
   dividing a range of the first reconstructed value into a first number of bands; and
   determining a band index of the first reconstructed value;
   the determining the second classification result of the target chroma sample based on the second reconstructed value further comprises:
   dividing a range of the second reconstructed value into a second number of bands; and
   determining a band index of the second reconstructed value; and
   the determining the offset based on the classifying further comprises:
   determining a category index of the target chroma sample based on the band index of the first reconstructed value, the band index of the second reconstructed value, and one of the first number and the second number; and
   determining the offset corresponding to the category index of the target chroma sample.

21. The method according to claim 20, wherein the band index of the first reconstructed value is obtained by:

$$idx\_L=(Y_{rec}^{dbf}*N_L)\text{>>bitdepth},$$

the band index of the second reconstructed value is obtained by:

$$idx\_C=(C_{rec}^{dbf}*N_C)\text{>>bitdepth, and}$$

the category index of the target chroma sample is obtained by:

$$idx=idx\_L*N_C+idx\_C \text{ or } idx=idx\_C*N_L+idx\_L;$$

wherein the $Y_{rec}^{dbf}$ is the first reconstructed value, the $C_{rec}^{dbf}$ is the second reconstructed value, the bitdepth is an internal coding bit depth, the $N_L$ is the first number, the $N_C$ is the second number, the idx_L is the band index of the first reconstructed value, the idx_C is the band index of the second reconstructed value, and the idx is the category index of the target chroma sample.

22. The method according to claim 18, wherein a band offset (BO) method and an edge offset (EO) method are applied on the co-located luma sample and the target chroma sample.

* * * * *